(12) United States Patent
Noda et al.

(10) Patent No.: US 9,103,648 B2
(45) Date of Patent: Aug. 11, 2015

(54) PROFILE MEASURING METHOD AND PROFILE MEASURING INSTRUMENT

(71) Applicant: MITUTOYO CORPORATION, Kawasaki-shi, Kanagawa (JP)

(72) Inventors: Takashi Noda, Utsunomiya (JP); Hiroshi Kamitani, Utsunomiya (JP); Naoya Kikuchi, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 188 days.

(21) Appl. No.: 13/836,006

(22) Filed: Mar. 15, 2013

(65) Prior Publication Data

US 2013/0283627 A1    Oct. 31, 2013

(30) Foreign Application Priority Data

Apr. 26, 2012   (JP) .................................. 2012-101715

(51) Int. Cl.
| | |
|---|---|
| *G01B 5/008* | (2006.01) |
| *G01B 5/20* | (2006.01) |
| *G01B 21/04* | (2006.01) |
| *G05B 19/4093* | (2006.01) |

(52) U.S. Cl.
CPC ................ *G01B 5/008* (2013.01); *G01B 5/202* (2013.01); *G01B 21/04* (2013.01); *G05B 19/40931* (2013.01)

(58) Field of Classification Search
CPC ................................... G01B 5/008; G01B 5/20
USPC ............. 33/503, 551, 553, 554, 556; 73/1.79, 73/105, 104; 702/168, 167
See application file for complete search history.

(56) References Cited

U.S. PATENT DOCUMENTS

| | | | | |
|---|---|---|---|---|
| 4,807,152 | A | * | 2/1989 | Lane et al. .................... 700/247 |
| 5,334,918 | A | * | 8/1994 | McMurtry et al. ........ 318/568.16 |
| 5,461,797 | A | * | 10/1995 | Royer et al. .................. 33/501.7 |
| 5,471,406 | A | | 11/1995 | Breyer et al. |

(Continued)

FOREIGN PATENT DOCUMENTS

| | | |
|---|---|---|
| JP | 3433710 | 5/2003 |
| JP | 2005-345123 | 12/2005 |
| WO | 99/58931 | 11/1999 |

OTHER PUBLICATIONS

European Search Report dated Jul. 19, 2013, 6 pages.

*Primary Examiner* — Christopher Fulton
(74) *Attorney, Agent, or Firm* — Rankin, Hill & Clark LLP

(57) ABSTRACT

A controller of a profile measuring instrument includes: an information acquirer that acquires profile information on a profile of a workpiece and a probe command unit that calculates a probe command value for moving the probe by a movement mechanism based on the profile information acquired by the information acquirer. The probe command value is a value for causing a movement of the stylus tip along a lateral face of an imaginary cone that is imaginarily defined in accordance with the profile of the workpiece based on the profile information, the movement of the stylus tip being performed while a distance between a center of the stylus tip and a reference axis passing through a center of a bottom face of the imaginary cone and parallel to the lateral face of the imaginary cone is kept constant.

2 Claims, 19 Drawing Sheets

(56) References Cited

U.S. PATENT DOCUMENTS

| | | | | |
|---|---|---|---|---|
| 6,154,713 | A * | 11/2000 | Peter et al. | 702/95 |
| 6,158,136 | A * | 12/2000 | Gotz et al. | 33/503 |
| 6,587,810 | B1 | 7/2003 | Guth et al. | |
| 7,392,692 | B2 * | 7/2008 | Noda | 73/105 |
| 7,783,445 | B2 * | 8/2010 | McLean et al. | 702/95 |
| 7,950,164 | B2 * | 5/2011 | Nakayama et al. | 33/556 |
| 2010/0119104 | A1 * | 5/2010 | Mamour et al. | 382/100 |
| 2011/0184695 | A1 | 7/2011 | Grzesiak | |

\* cited by examiner

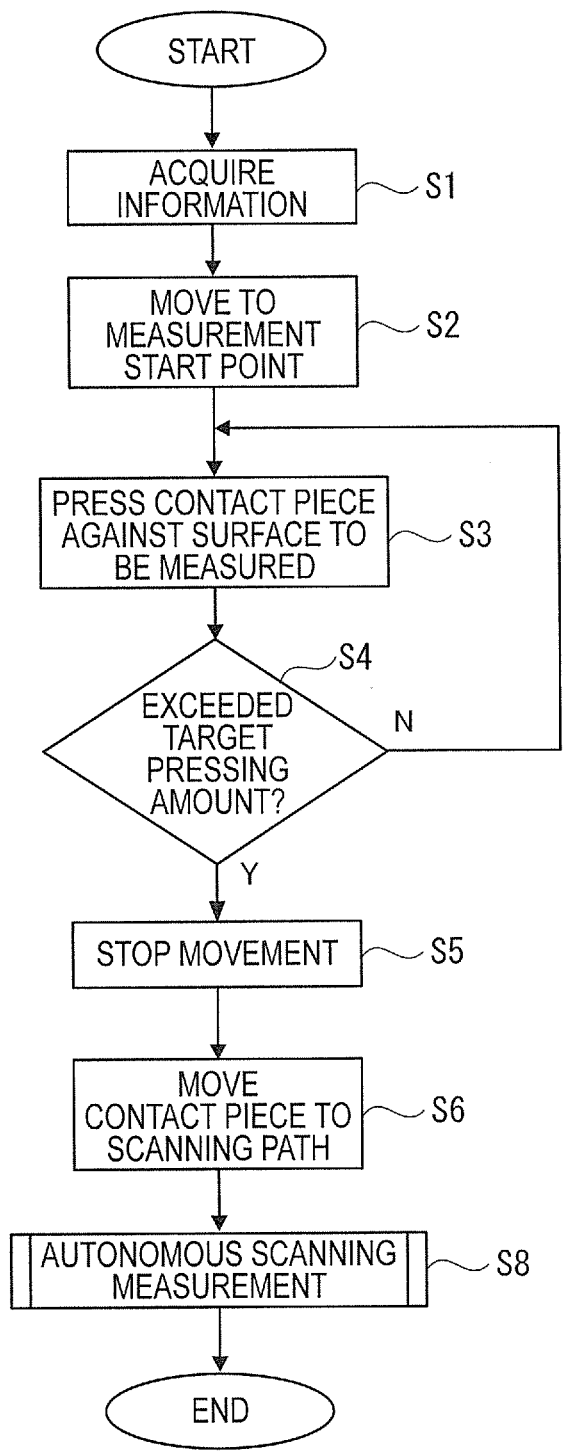

PROFILE MEASURING METHOD AND PROFILE MEASURING INSTRUMENT

The entire disclosure of Japanese Patent Applications No. 2012-101715 filed Apr. 26, 2012 is expressly incorporated by reference herein.

BACKGROUND OF THE INVENTION

1. Field of the Invention

The present invention relates to a profile measuring method and a profile measuring instrument.

2. Description of Related Art

Some of known profile measuring instruments include a probe that has a stylus tip to be in contact with a workpiece, a movement mechanism for moving the probe, and a controller for controlling the movement mechanism has been conventionally known, where the stylus tip is moved along a target surface of the workpiece while the stylus tip is pressed against the workpiece to measure a profile of the workpiece (see, for instance, Literature 1: JP-A-2005-345123).

A coordinate measuring machine (profile measuring instrument) disclosed in the Literature 1 includes a motion controller that has an autonomous scanning vector generator that generates a velocity vector (probe command value) for moving the stylus tip along a target surface of the workpiece while the stylus tip is pressed against the workpiece.

FIG. 18 shows a stylus tip 100 that is moved along a target surface (lateral face of a truncated cone) of a truncated-cone-shaped workpiece W.

As shown in FIG. 18, the autonomous scanning vector generator defines a workpiece coordinate system for measuring the profile of the workpiece W, in which a central axis of the workpiece W is defined as a $Z_W$-axis, and two axes orthogonal to the $Z_W$-axis are defined as a $X_W$-axis and $Y_W$-axis. An instance in which the stylus tip 100 is moved along the measurement target face of the workpiece W within a restraining section S (shown in two-dot chain lines in FIG. 18) of which coordinate value in the $Z_W$-axis direction (i.e. in a height direction of the workpiece W) is set at a constant $Z_h$ to measure the profile of the workpiece W at the $Z_W$-axis coordinate value $Z_h$ (referred to as a "constant-height scanning measurement" hereinafter) will be described below. It should be noted that a locus LS of a point to be measured (referred to as a measurement target point hereinafter) is represented by a two-dot chain line in FIG. 18. Further, in order to simplify the drawing, a part of reference signs to be used in a later-described formula including the above-mentioned $Z_W$-axis coordinate value $Z_h$ is omitted in FIG. 18.

The autonomous scanning vector generator generates a velocity vector $V_P$ in an advancement direction of a scanning probe as shown in the following formula (1) supposing that a direction in which the stylus tip 100 is pressed (i.e. a deflection direction of the stylus tip 100) is normal to the measurement target face of the workpiece W at a contact point between the stylus tip 100 and the measurement target face.

$$\vec{V}_P = V_S \cdot \vec{P}_u \qquad (1)$$

In the formula (1), $V_S$ is a parameter for controlling velocity in the advancement direction. For instance, the parameter $V_S$ is set to be small when a deviation from the target value in the deflection direction or the height direction becomes large.

The vector $P_u$ is a unit vector of a vector $P$ calculated according to the following formula (2).

$$\vec{P} = \vec{E} \times \vec{Z}_u \qquad (2)$$

In the formula (2), the operator × represents an outer product of the vector, which also applies in the later formulae.

Thus, the vector P is an outer product of a vector E based on a deflection value of the stylus tip 100 and the unit vector $Z_u$ in the $Z_W$-axis direction.

The autonomous scanning vector generator also generates a velocity vector $V_E$ in the deflection direction as shown in the following formula (3).

$$\vec{V}_E = V_e \cdot (|\vec{E}| - E_O) \cdot \vec{E}_u \qquad (3)$$

In the formula (3), $V_e$ is a parameter for controlling the velocity in the deflection direction. $E_O$ is a reference deflection value of the scanning probe (i.e. a target value in the deflection direction). The vector $E_u$ is a unit vector of the vector E.

The autonomous scanning vector generator also generates a velocity vector $V_H$ in the height direction of the scanning probe as shown in the following formula (4).

$$\vec{V}_H = V_h \cdot (C_h - Z_h) \cdot \vec{H}_h \qquad (4)$$

In the formula (4), $V_h$ is a parameter for controlling the velocity in the height direction. $C_h$ is a $Z_W$-axis coordinate value at a center of the stylus tip 100. $Z_h$ is a $Z_W$-axis coordinate value of the restraining section S (a target value in the height direction).

Further, a vector $H_h$ is a vector parallel to the measurement target face of the workpiece W of which magnitude in the $Z_W$-axis direction is 1. The vector $H_h$ is calculated according to the following formulae (5) and (6).

$$\vec{H}_h = \frac{\vec{H}_u}{(\vec{H}_u, \vec{Z}_u)} \qquad (5)$$

$$\vec{H}_u = \vec{P}_u \times \vec{E}_u \qquad (6)$$

In the formula (5), the operator (,) represents an inner product of the vector, which also applies in the later formulae.

Thus, the vector $H_h$ is equal to the vector $H_u$ divided by the inner product of the vector $H_u$ and the unit vector $Z_u$ in the $Z_W$-axis direction. The vector $H_u$ is an outer product of the vector $P_u$ and the vector $E_u$.

Then, the autonomous scanning vector generator synthesizes each of the velocity vectors $V_P$, $V_E$ and $V_H$ as shown in the following formula (7) to generate a velocity vector $V_C$ (probe command value) in the scanning direction in which the stylus tip 100 is moved along the measurement target face of the workpiece W.

$$\vec{V}_C = \vec{V}_P + \vec{V}_E + \vec{V}_H \qquad (7)$$

FIGS. 19A and 19B illustrate a problem associated with the typical arrangement. Specifically, FIG. 19A is a perspective view of a straight bevel gear W1 (the workpiece). FIG. 19B is a perspective view in which an area Ar1 in FIG. 19A is enlarged to show a tooth flank WF1 (measurement target face).

Incidentally, in order to simplify the drawing, only a part of teeth of the straight bevel gear W1 is shown in solid lines and the rest of the teeth are imaginarily shown in two-dot chain lines in FIG. 19A.

The tooth flank WF1 of the straight bevel gear W1 shown in FIGS. 19A and 19B does not conform to a plane (the above-described restraining section) orthogonal to the $Z_W$-axis (i.e. the central axis of the straight bevel gear W1).

Thus, it is difficult to move the stylus tip along the tooth flank WF1 according to the above-described constant-height scanning measurement and, consequently, it is difficult to measure the tooth flank WF1.

In order to measure the tooth flank WF1 of the straight bevel gear W1 as shown in FIGS. 19A and 19B, a point measurement in which the stylus tip is brought into contact with a plurality of points on the tooth flank WF1 may be employed instead of the autonomous scanning measurement.

However, the measurement of the tooth flank WF1 by way of the point measurement requires much measurement time.

SUMMARY OF THE INVENTION

An object of the invention is to provide a profile measuring method and a profile measuring instrument capable of reducing a measurement time.

A profile measuring method according to an aspect of the invention uses a profile measuring instrument, the profile measuring instrument including: a probe having a stylus tip to be in contact with a workpiece; a movement mechanism that is adapted to move the probe; and a controller that is adapted to control the movement mechanism, the stylus tip being moved along a measurement target face of the workpiece while the stylus tip is pressed against the measurement target face of the workpiece to measure a profile of the measurement target face, the method including: acquiring profile information on the profile of the workpiece; and calculating a probe command value for moving the probe by the movement mechanism based on the profile information acquired in the acquiring of the information, the acquiring of the information and the calculating of the probe command value being performed by the controller, in which the probe command value is a value for causing a movement of the stylus tip along a lateral face of an imaginary cone that is imaginarily defined in accordance with the profile of the workpiece based on the profile information, the movement of the stylus tip being performed while a distance between a center of the stylus tip and a reference axis passing through a center of a bottom face of the imaginary cone and parallel to the lateral face of the imaginary cone is kept constant.

The outer profile of the straight bevel gear is in a form of a substantially truncated cone that defines a part of a cone. The tooth flank of the straight bevel gear extends along a lateral face of a cone imaginarily defined in accordance with the outer profile of the straight bevel gear (referred to as an imaginary cone) and substantially conforms to a vertical cross section of the imaginary cone.

In the above aspect of the invention, based on the finding that the tooth flank (measurement target face) of the straight bevel gear extends along the lateral face of the imaginary cone and substantially conforms to the vertical cross section of the imaginary cone, the profile measuring method employs the above-described acquiring of the information (information acquisition step) and the calculating of the probe command value (probe-command-value calculating step).

Specifically, in the information acquisition step, the controller of the profile measuring instrument acquires profile information related to the profile of the workpiece (straight bevel gear) (information including an apex angle of the imaginary cone imaginarily defined in accordance with the outer profile of the straight bevel gear, a radius of a bottom surface of the imaginary cone and a center of the bottom surface of the imaginary cone).

In the probe-command-value calculating step, the controller calculates the probe command value for causing the movement of the stylus tip along the lateral face of the imaginary cone, the movement of the stylus tip being performed while a distance between a center of the stylus tip and a reference axis passing through the center of the bottom face of the imaginary cone and parallel to the lateral face of the imaginary cone is kept constant.

Thus, by operating the movement mechanism in accordance with the probe command value, the stylus tip can be moved along the tooth flank of the straight bevel gear. In other words, the tooth flank of the straight bevel gear can be measured by an autonomous scanning measurement.

Thus, as compared to an instance in which the tooth flank of the straight bevel gear is measured by a point measurement, the measurement time can be significantly reduced.

In the profile measuring method according to the above aspect of the invention, it is preferable that the profile measuring instrument comprises a rotary table on which the workpiece is adapted to be fixed, the rotary table being adapted to be rotated to rotate the workpiece relative to the probe, and the profile measuring method further includes calculating a table command value for rotating the rotary table based on the probe command value calculated in the calculating of the probe command value, the calculating of the table command value being performed by the controller.

In the above aspect of the invention, the above-described calculating of the table command value (table-command-value calculating step) is performed.

Thus, the autonomous scanning measurement can be performed on a tooth flank of a helical bevel gear etc. having a curved tooth trace as well as the above-described straight bevel gear having a straight tooth trace.

Specifically, in the table-command-value calculating step, the table command value for rotating the rotary table is calculated based on the probe command value. Thus, by rotating the rotary table in synchronization with the table command value, the rotary table (workpiece) can be rotated in synchronization with the movement of the stylus tip based on the probe command value, whereby the stylus tip can be moved along the curved tooth trace of the helical bevel gear and the like.

In addition, since the rotary table can be rotated in synchronization with the movement of the stylus tip in accordance with the probe command value, it is not necessary to alter the attitude of the probe considering the mechanical interference between the helical bevel gear and the probe when the autonomous scanning measurement is performed on the tooth flank of the helical bevel gear and the like. In other words, since it is not necessary to alter the attitude of the probe, the measurement time can be further reduced.

A profile measuring instrument according to another aspect of the invention includes: a probe having a stylus tip to be in contact with a workpiece; a movement mechanism that is adapted to move the probe; and a controller that is adapted to control the movement mechanism, the stylus tip being moved along a measurement target face of the workpiece while the stylus tip is pressed against the measurement target face of the workpiece to measure a profile of the measurement target face, in which the controller includes: an information acquirer that acquires profile information on the profile of the workpiece; and a probe command unit that calculates a probe command value for moving the probe by the movement mechanism based on the profile information acquired by the information acquirer, and the probe command value is a value for causing a movement of the stylus tip along a lateral face of an imaginary cone that is imaginarily defined in accordance with an outer profile of the workpiece based on the profile information, the movement of the stylus tip being performed while a distance between a center of the stylus tip and a reference axis passing through a center of a bottom face of the imaginary cone and parallel to the lateral face of the imaginary cone is kept constant.

Since the profile measuring instrument of the above aspect of the invention is adapted to implement the above-described profile measuring method, advantages and effects similar to those of the above-described profile measuring method can be obtained.

BRIEF DESCRIPTION OF THE DRAWINGS

FIG. 13 is a flowchart showing a profile measuring method according to the second exemplary embodiment.

DESCRIPTION OF EMBODIMENT(S)

First Exemplary Embodiment

A first exemplary embodiment of the invention will be described below with reference to the attached drawings.

Overall Structure of Coordinate Measuring Machine

Figure 1:
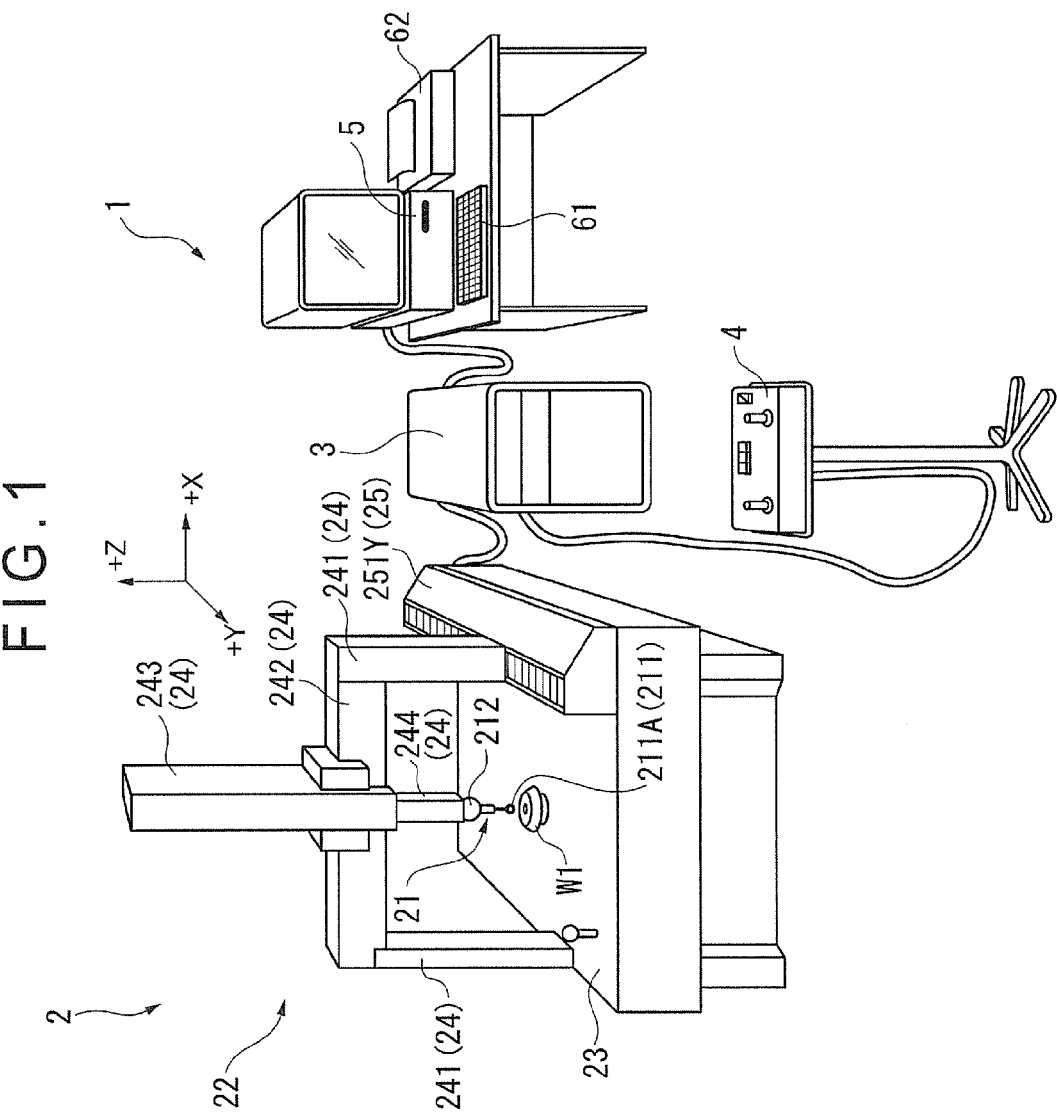
FIG. 1 schematically illustrates an overview of a coordinate measuring machine according to a first exemplary embodiment of the invention.

FIG. 1 schematically illustrates an overview of a coordinate measuring machine 1 according to the first exemplary embodiment.

Figure 2:
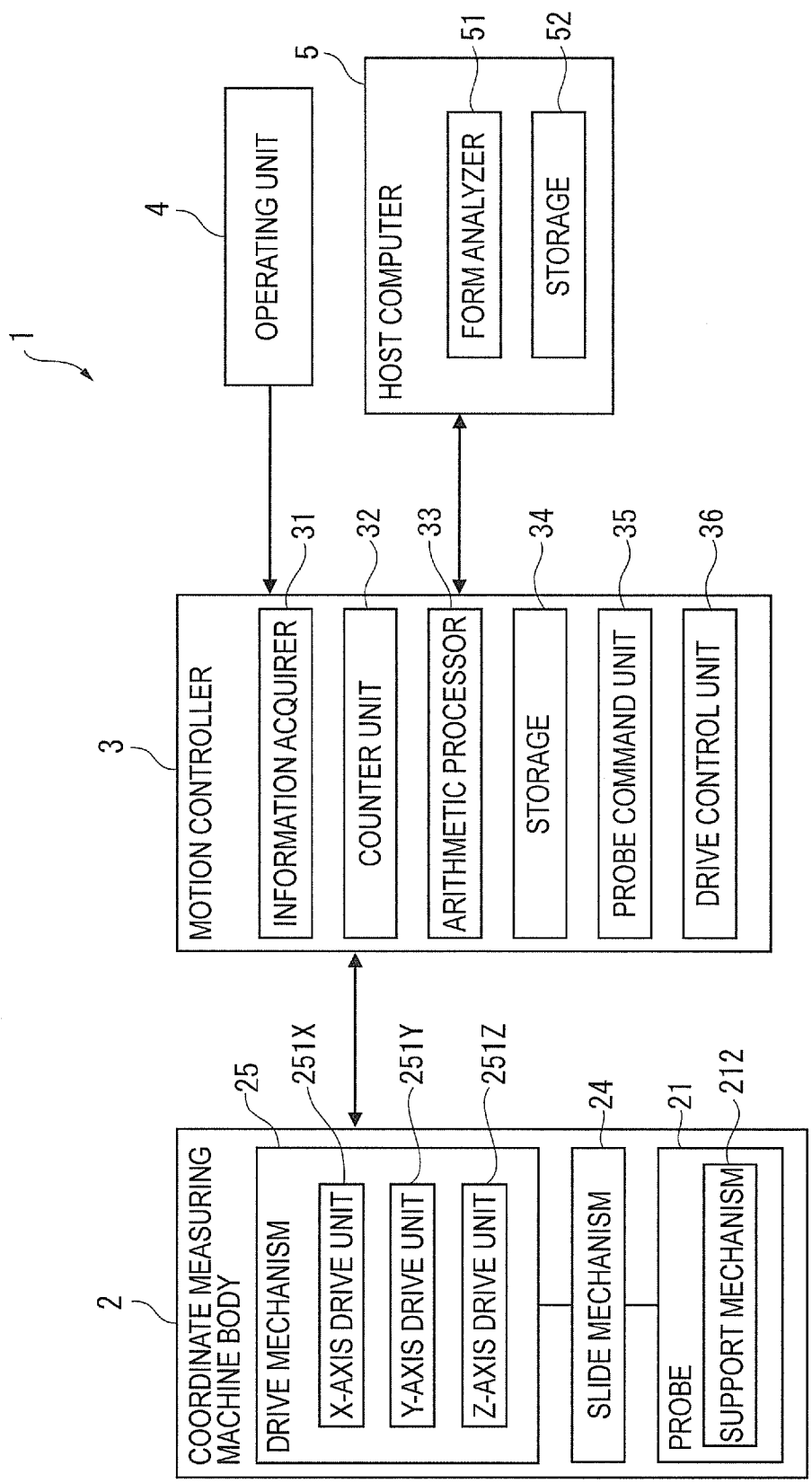
FIG. 2 is a block diagram showing an overall structure of the coordinate measuring machine according to the first exemplary embodiment.

FIG. 2 is a block diagram showing an overall structure of the coordinate measuring machine 1.

It should be noted that an upper direction in FIG. 1 will be referred to as +Z-axis direction and two axes orthogonal to the Z-axis will be respectively referred to as X-axis and Y-axis. The X-axis direction, Y-axis direction and Z-axis direction define a machine coordinate system. This also applies in the rest of drawings.

Figure 19A:
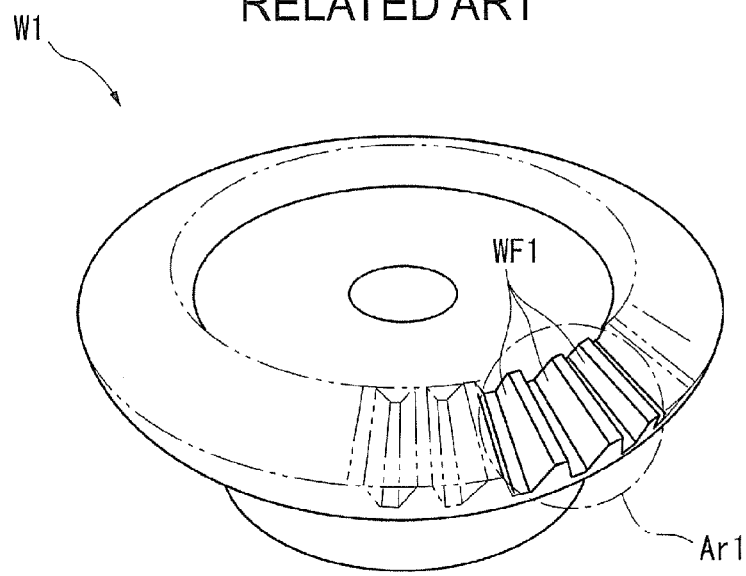
FIG. 19A illustrates a problem associated with a typical arrangement.
Figure 19B:
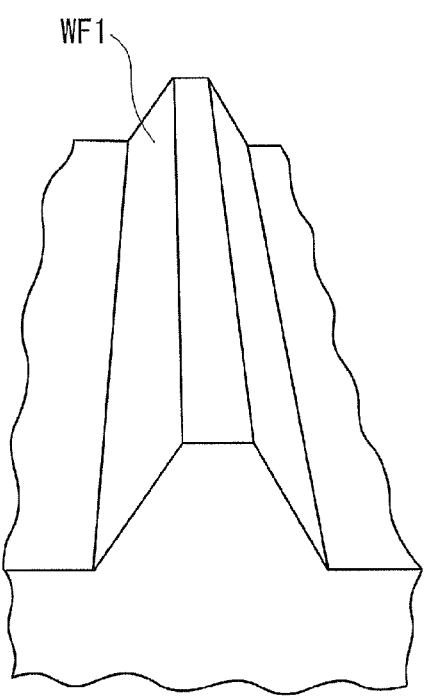
FIG. 19B illustrates the problem associated with the typical arrangement.

In this exemplary embodiment, for the convenience of description, a straight bevel gear W1 (with a tooth flank WF1 (measurement target face)) shown in FIGS. 19A and 19B will be used as a workpiece.

As shown in FIG. 1 or 2, the coordinate measuring machine 1 (profile measuring instrument) includes: a coordinate measuring machine body 2; a motion controller 3 for controlling a drive of the coordinate measuring machine body 2; an operating unit 4 that provides a command to the motion controller 3 via a control lever and the like to manually operate the coordinate measuring machine body 2; a host computer 5 that provides a predetermined command to the motion controller 3 and performs an arithmetic processing; and an input unit 61 (FIG. 1) and an output unit 62 (FIG. 1) that are connected with the host computer 5.

The input unit 61 inputs measurement conditions and the like of the coordinate measuring machine 1 to the host computer 5. The output unit 62 outputs the measurements of the coordinate measuring machine 1.

Structure of Coordinate Measuring Machine Body

As shown in FIG. 1, the coordinate measuring machine body 2 includes a probe 21 having a spherical stylus tip 211A for measuring a workpiece, a movement mechanism 22 that holds and moves the probe 21 and a base 23 on which the movement mechanism 22 is vertically provided.

As shown in FIG. 1, the probe 21 includes a stylus 211 having a stylus tip 211A at an end thereof (in −Z-axis direction) and a support mechanism 212 that supports a base end (in +Z-axis direction) of the stylus 211.

The support mechanism 212 supports the stylus 211 while biasing the stylus 211 in each of the X, Y and Z-axis directions so that the stylus 211 is located at a predetermined position. The support mechanism 212 also allows the movement of the stylus 211 in each of the X, Y and Z-axis directions within a predetermined range when an external force is applied (i.e. when the stylus tip 211A is in contact with the workpiece).

Though not specifically shown, probe sensors for detecting the position of the stylus 211 in the respective axis directions are provided to the support mechanism 212.

Incidentally, each of the probe sensors are provided by a position sensor that outputs pulse signals in accordance with the displacement of the stylus 211 in the respective axis directions.

As shown in FIGS. 1 and 2, the movement mechanism 22 includes a slide mechanism 24 that holds the probe 21 and allows a slide movement of the probe 21 and a drive mechanism 25 that drives the slide mechanism 24 to move the probe 21.

As shown in FIG. 1, the slide mechanism 24 includes: two columns 241 that extend in +Z-axis direction from both ends of the base 23 in the X-axis direction and are capable of slide movement in the Y-axis direction; a beam 242 that is supported by the columns 241 and extend in the X-axis direction; a cylindrical slider 243 that extends in the Z-axis direction and is capable of slide movement in the X-axis direction on the beam 242; and a ram 244 inserted into the slider 243 in a manner capable of slide movement in the Z-axis direction inside the slider 243.

As shown in FIG. 1 or 2, the drive mechanism 25 includes a Y-axis drive unit 251Y that supports one of the columns 241 located in the +X-axis direction and effects a slide movement of the column 241 in the Y-axis direction; an X-axis drive unit 251X (FIG. 2) that causes the slide movement of the slider 243 on the beam 242 to move the slider 243 in the X-axis direction; and a Z-axis drive unit 251Z (FIG. 2) that causes the slide movement of the ram 244 inside the slider 243 to move the ram 244 in the Z-axis direction.

Though not specifically shown, a scale sensor for detecting the positions of the slider 243, the columns 241 or the ram 244 in the respective axis directions is provided to each of the X-axis drive unit 251X, the Y-axis drive unit 251Y and the Z-axis drive unit 251Z.

Incidentally, each of the scale sensors is provided by a position sensor that outputs pulse signals in accordance with the displacement of the slider 243, the columns 241 and the ram 244.

Structure of Motion Controller

As shown in FIG. 2, the motion controller 3 (controller) includes an information acquirer 31, a counter unit 32, an arithmetic processor 33, storage 34, a probe command unit 35 and a drive control unit 36.

The information acquirer 31 acquires from the host computer 5 a profile data of the straight bevel gear W1 and the measurement condition data of the straight bevel gear W1.

The counter unit 32 counts the pulse signals outputted from the respective scale sensors to measure the displacement of the slide mechanism 24 and counts the pulse signals outputted from the respective probe sensors to measure the displacement of the stylus 211.

The arithmetic processor 33 calculates the position $P_P$ of the stylus tip 211A (referred to as a probe position $P_P$ (see FIGS. 9A and 9B)) based on the displacement of the slide mechanism 24 and the displacement of the stylus 211 measured by the counter unit 32.

The arithmetic processor 33 stores the calculated probe position $P_P$ in the storage 34.

In addition, the arithmetic processor 33 calculates the overtraveling amount (magnitude of the vector E) of the stylus tip 211A based on the displacement (detection values (x, y, z) of the respective probe sensors) of the stylus 211 measured by the counter unit 32 as shown in the following formula (8).

$$|\vec{E}| = \sqrt{x^2 + y^2 + z^2} \quad (8)$$

Figure 3:
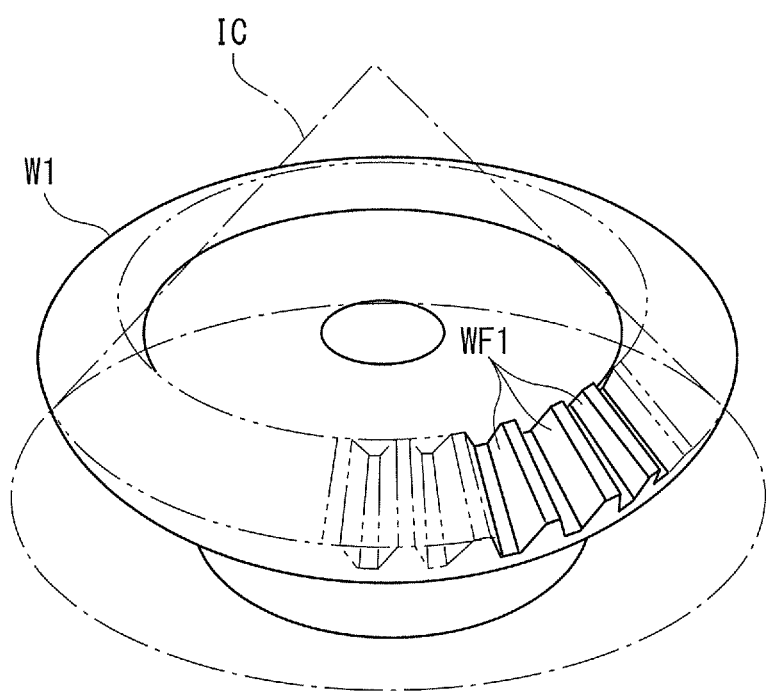
FIG. 3 is an illustration schematically showing a probe command value according to the first exemplary embodiment.
Figure 4:
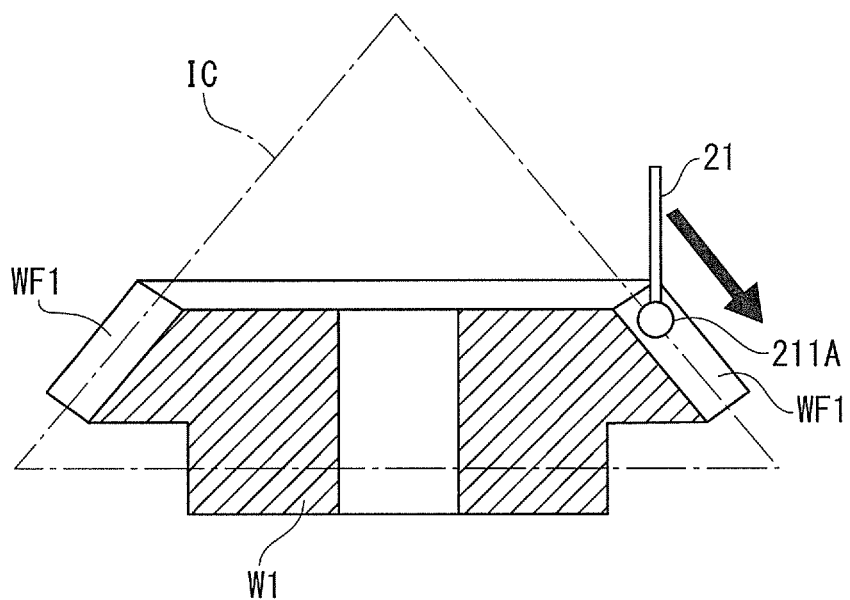
FIG. 4 is another illustration schematically showing the probe command value according to the first exemplary embodiment.

FIGS. 3 and 4 are illustrations schematically showing a probe command value. Specifically, FIG. 3 is a perspective view of an imaginary cone IC imaginarily defined in accordance with an outer profile of the straight bevel gear W1. FIG. 4 is a vertical cross section of FIG. 3.

Based on the probe position $P_P$ and the overtraveling amount calculated by the arithmetic processor 33 and the profile information acquired by the information acquirer 31, the probe command unit 35 calculates the probe command value for moving the stylus tip 211A along the tooth flank WF1 of the straight bevel gear W1 while the stylus tip 211A is pressed against the tooth flank WF1.

As shown in FIGS. 3 and 4, the outer profile of the straight bevel gear W1 is in a form of a substantially truncated cone that defines a part of the cone IC. In other words, the virtual cone IC (imaginary cone IC) can be assumed in accordance with the outer profile of the straight bevel gear W1. The tooth flank WF1 of the straight bevel gear W1 extends along the lateral face of the imaginary cone IC and substantially conforms to a vertical cross section of the imaginary cone IC.

The probe command value is a command value for moving the stylus tip 211A along the lateral face of the imaginary cone IC while a distance between the position $P_P$ (referred to as probe position $P_P$ hereinafter) (see FIGS. 9A and 9B) of the stylus tip 211A and a reference axis SAx (see FIG. 9A) passing through a center $P_C$ (see FIGS. 9A and 9B) of the imaginary cone IC and parallel to the lateral face of the imaginary cone IC stays constant.

The drive control unit 36 controls the drive mechanism 25 to move the probe 21 according to the probe command value calculated by the probe command unit 35.

Structure of Host Computer

The host computer 5 includes a CPU (Central Processing Unit), memory and the like. The host computer 5 provides a predetermined command to the motion controller 3 to control the coordinate measuring machine body 2.

As shown in FIG. 2, the host computer 5 includes a form analyzer 51 and storage 52.

The form analyzer 51 calculates a surface profile data of the workpiece based on the measurement data (probe position $P_P$ stored in the storage 34) outputted from the motion controller 3 and performs a profile analysis for calculating an error or distortion of the calculated surface profile data of the workpiece.

The storage 52 stores the data used in the host computer 5, profile data (profile information) related to the profile of the straight bevel gear W1 (workpiece), the measurement condition data of the straight bevel gear W1 and the like.

Figure 9A:
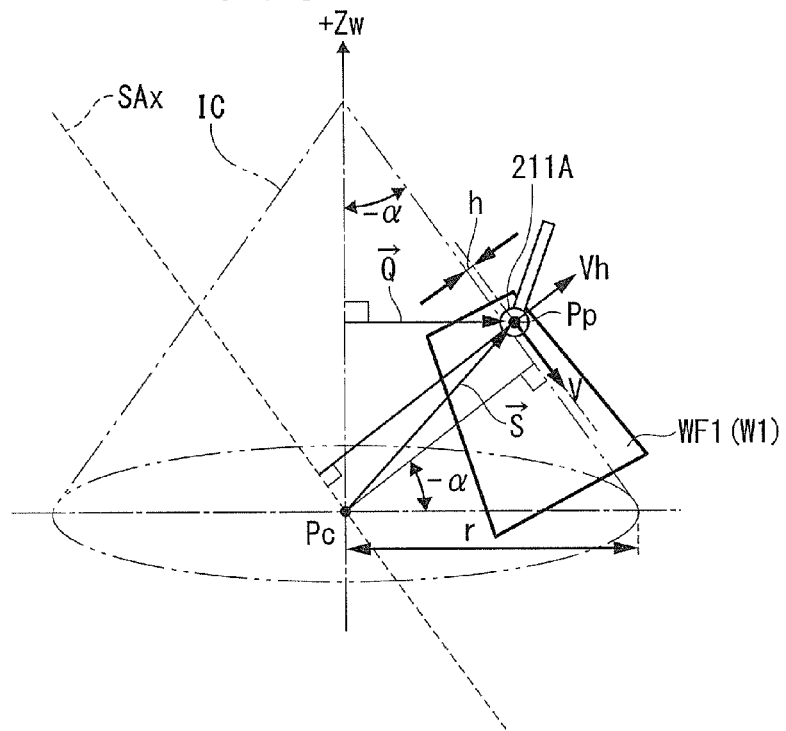
FIG. 9A is an illustration showing the Step S7 according to the first exemplary embodiment.

The profile data includes a radius r of the bottom face of the imaginary cone IC that is imaginarily defined in accordance with the outer profile of the straight bevel gear W1, coordinates of the center $P_C$ of the imaginary cone IC, a semi-apex angle α of the imaginary cone IC (in which positive (+) is defined in a direction enlarging from the center $P_C$ to an apex of the imaginary cone IC) and the like (see FIG. 9A).

The measurement condition data is a data designated in accordance with the outer profile of the straight bevel gear W1. The measurement condition data includes coordinates of the temporarily designated measurement start point, information on an approach direction for pressing the stylus tip 211A from the measurement start point against the tooth flank WF1 of the straight bevel gear W1 and the like.

Profile Measuring Method

Next, a profile measuring method using the above-described coordinate measuring machine 1 will be described below.

Figure 5:
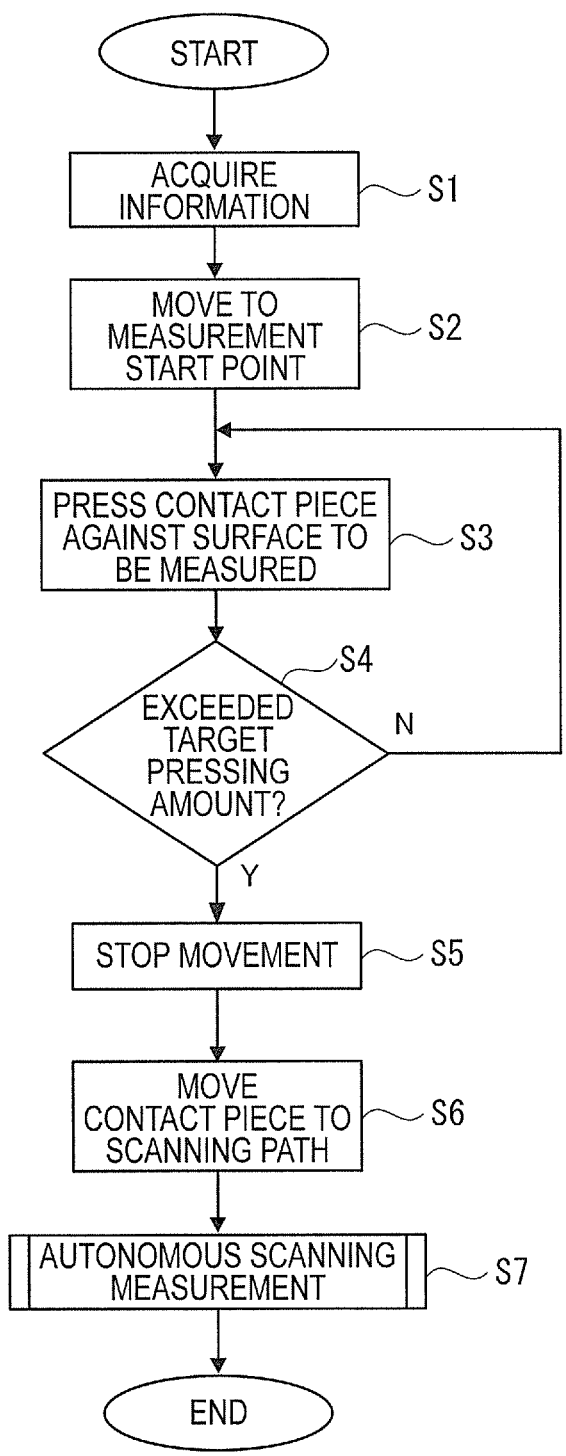
FIG. 5 is a flowchart showing a profile measuring method according to the first exemplary embodiment.

FIG. 5 is a flowchart showing the profile measuring method.

FIGS. 6A to 6E are illustrations showing the profile measuring method. Specifically, FIGS. 6A to 6E are illustrations showing Steps S2 to S7.

Initially, the information acquirer 31 acquires from the host computer 5 the profile data and the measurement condition data of the straight bevel gear W1 (both of the profile data and the measurement condition data being stored in the storage 52) (step S1: information acquisition step).

After the step S1, the probe command unit 35 recognizes the probe position $P_P$ calculated by the arithmetic processor 33. Further, the probe command unit 35 outputs to the drive control unit 36 the probe command value for locating the probe position $P_P$ at the measurement start point contained in the measurement condition data based on the measurement condition data of the straight bevel gear W1 acquired in the Step S1 (Step S2).

Figure 6A:
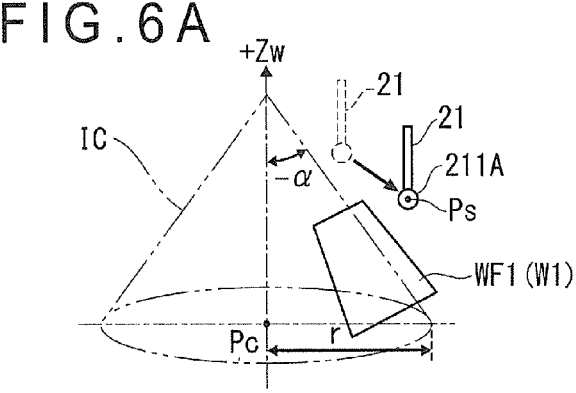
FIG. 6A is an illustration showing the profile measuring method according to the first exemplary embodiment.

Then, the drive control unit 36 controls the drive mechanism 25 to move the probe 21 to the measurement start point $P_s$ as shown in FIG. 6A.

After the Step S2, the probe command unit 35 outputs to the drive control unit 36 the probe command value for moving the stylus tip 211A in the approach direction contained in the measurement condition data (Step S3).

Figure 6B:
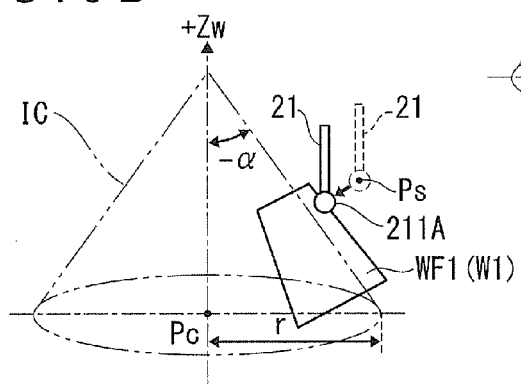
FIG. 6B is another illustration showing the profile measuring method according to the first exemplary embodiment.

The drive control unit 36 controls the drive mechanism 25 to press the stylus tip 211A against the tooth flank WF1 as shown in FIG. 6B.

After the Step S3, the probe command unit 35 judges whether or not the stylus tip 211A is brought into contact with the tooth flank WF1 and a target overtraveling amount is exceeded while checking the overtraveling amount of the stylus tip 211A calculated by the arithmetic processor 33 (Step S4).

When the probe command unit 35 judges "Y" in the Step S4, the probe command unit 35 outputs to the drive control unit 36 the probe command value for stopping the movement of the stylus tip 211A in the approach direction (Step S5).

Then, the drive control unit 36 controls the drive mechanism 25 to stop the movement of the stylus tip 211A in the approach direction.

After the Step S5, the probe command unit 35 outputs the probe command value for locating the probe position $P_P$ on a scanning path to the drive control unit 36 (Step S6).

Figure 6C:
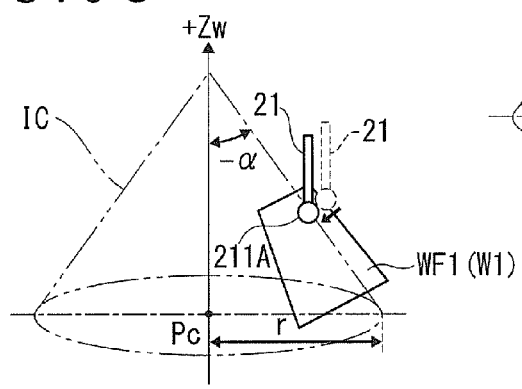
FIG. 6C is still another illustration showing the profile measuring method according to the first exemplary embodiment.

Then, the drive control unit 36 controls the drive mechanism 25 to move the probe 21 to the scanning path (the lateral face of the imaginary cone IC) as shown in FIG. 6C.

Figure 7A:
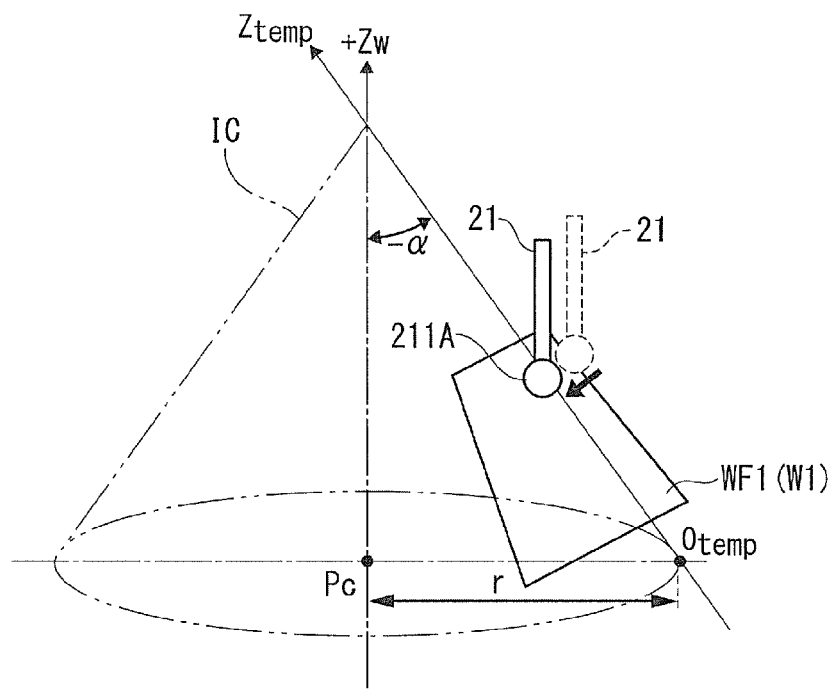
FIG. 7A is an illustration showing a Step S6 according to the first exemplary embodiment.
Figure 7B:
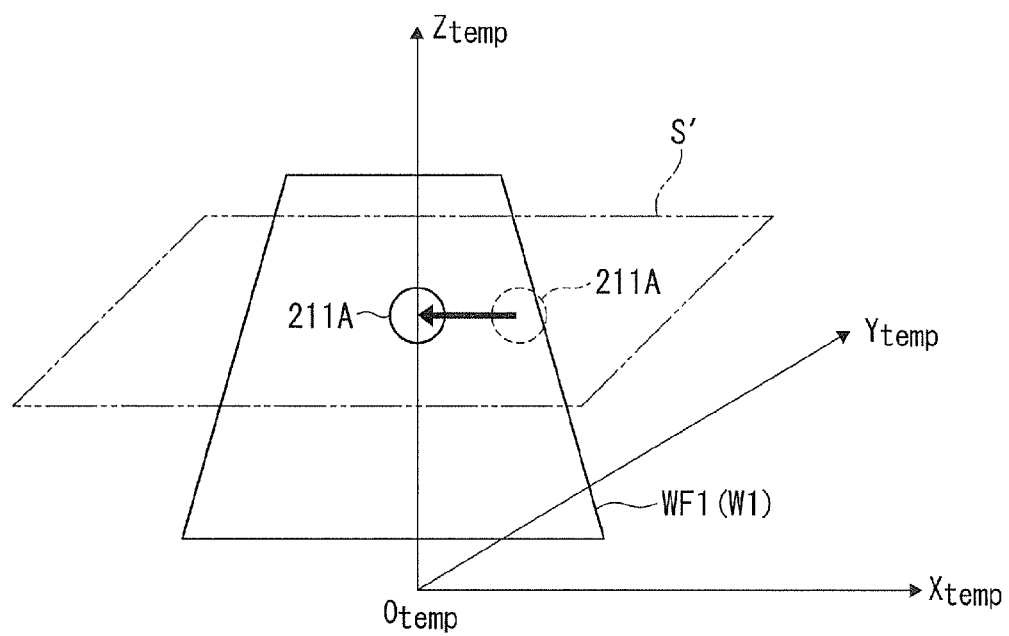
FIG. 7B is another illustration showing the Step S6 according to the first exemplary embodiment.

FIGS. 7A and 7B illustrate the Step S6. Specifically, FIG. 7A corresponds to FIG. 6C. FIG. 7B is an illustration showing a part of FIG. 7A that is turned so that a $Z_{temp}$ axis is oriented in up-and-down direction in the figure.

In the Step S6, the probe command unit 35 calculates the probe command value for locating the probe position $P_P$ on the scanning path as described below.

Herein, based on the profile data (the radius r of the bottom face of the imaginary cone IC, the semi-apex angle α of the imaginary cone IC) of the straight bevel gear W1 acquired in the Step S1, a temporary coordinate system defined by the $Z_{temp}$ axis (an axis along the lateral face of the imaginary cone IC) and $X_{temp}$ axis and $Y_{temp}$ axis orthogonal to the $Z_{temp}$ axis can be assumed.

An origin $O_{temp}$ of the temporary coordinate system is defined at a desired point on the $Z_{temp}$ axis.

The probe command unit 35 then recognizes the probe position $P_P$ (the probe position $P_P$ of the probe 21 shown in dashed lines in FIG. 7A) calculated by the arithmetic processor 33, and calculates the probe command value for moving the stylus tip 211A in a restraining section S' (two-dot chain line in FIG. 7B) in which $Z_{temp}$-axis coordinate value at the probe position $P_P$ stays at a constant $Z_a$ and to locate the probe position $P_P$ on the $Z_{temp}$-axis (scanning path).

Figure 6D:
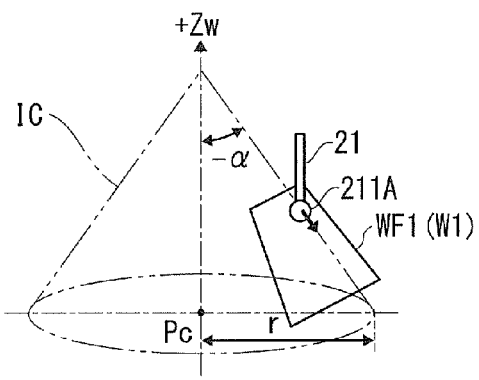
FIG. 6D is a further illustration showing the profile measuring method according to the first exemplary embodiment.
Figure 6E:
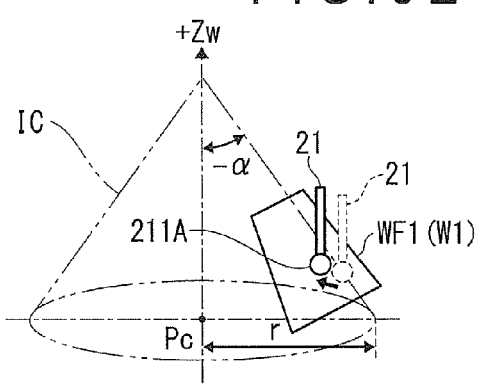
FIG. 6E is a still further illustration showing the profile measuring method according to the first exemplary embodiment.

After the Step S6, as shown in FIG. 6D, the motion controller 3 moves the probe 21 along the scanning path (the lateral face of the imaginary cone IC) to start an autonomous scanning measurement (Step S7).

Figure 8:
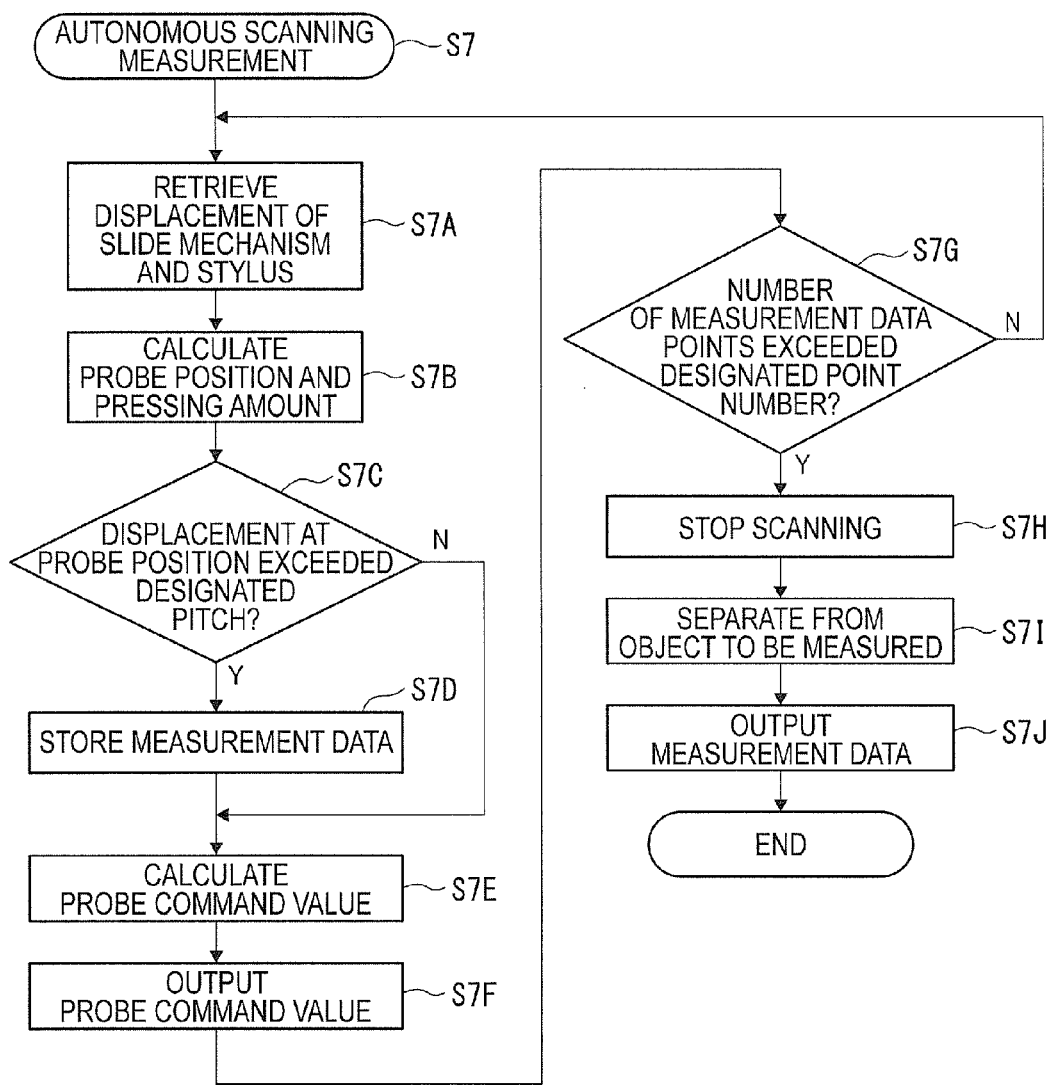
FIG. 8 is a flowchart showing a Step S7 according to the first exemplary embodiment.

FIG. 8 is a flowchart showing the Step S7.

Figure 9B:
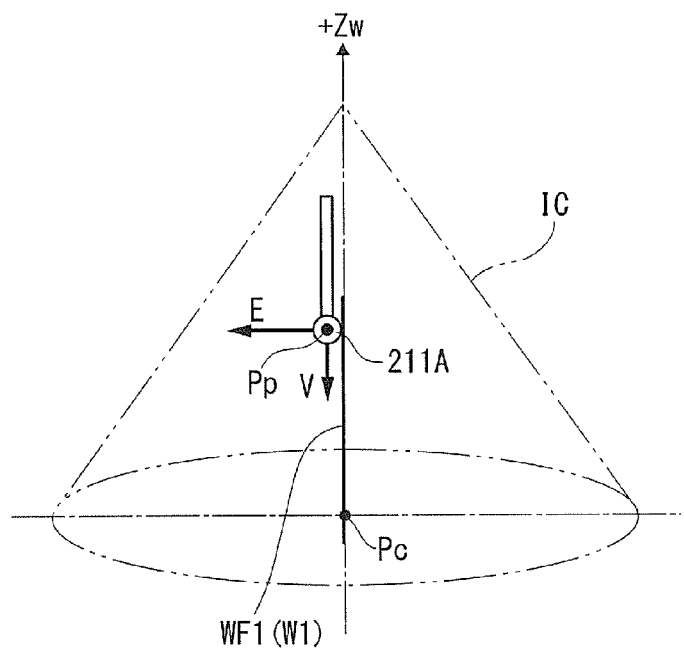
FIG. 9B is another illustration showing the Step S7 according to the first exemplary embodiment.

FIGS. 9A and 9B illustrate the Step S7.

Incidentally, in order to simplify the drawing, a part of reference signs to be used in a later-described formula is omitted in FIGS. 9A and 9B.

Initially, the arithmetic processor 33 acquires the displacements of the slide mechanism 24 and the stylus 211 measured by the counter unit 32 (Step S7A).

After the Step S7A, the arithmetic processor 33 calculates the probe position $P_P$ based on the acquired displacements of the slide mechanism 24 and the stylus 211 and calculates the overtraveling amount of the stylus tip 211A (Step S7B).

After the Step S7B, the arithmetic processor 33 judges whether or not the displacement ΔP of the probe position $P_P$ exceeds a predetermined pitch (Step S7C).

It should be noted that the above-mentioned displacement ΔP refers to a sum of difference values of the respective probe positions $P_P$ (i.e. the difference between the probe position $P_P$ stored in the storage 34 as the measurement data in the below-described Step S7D and the probe position(s) $P_P$ calculated in the Step S7B based on the displacements of the slide mechanism 24 and the stylus 211 acquired in the Step S7A per a predetermined sampling time (e.g. 0.4 msec)).

For instance, supposing that a probe position $P_{P1}$, a probe position $P_{P2}$ and a probe position $P_{P3}$ are respectively defined as the probe position $P_P$ stored as the measurement data in the Step S7D, a probe position $P_{P1}$; the probe position $P_P$ calculated in the Step S7B after elapsing the sampling time, and the probe position $P_P$ calculated in the Step S7B after elapsing the next sampling time (i.e. the current time), the displacement ΔP is the sum of the difference value between the probe positions $P_{P1}$ and $P_{P2}$ and the difference value between the probe positions $P_{P2}$ and $P_{P3}$.

When the arithmetic processor 33 judges "Y" in the Step S7C, the arithmetic processor 33 stores the probe position $P_P$ calculated in the preceding Step S7B (corresponding to the probe position $P_{P3}$ in the above instance) in the storage 34 as the measurement data (Step S7D). Then, the motion controller 3 performs the processing in Step S7E.

On the other hand, when the motion controller 3 judges "N" in the Step S7C, the motion controller 3 performs the processing in the Step S7E without performing the processing in the Step S7D.

In the Step S7E, the probe command unit 35 calculates the probe command value for moving the stylus tip 211A along the tooth flank WF1 while the stylus tip 211A is pressed against the tooth flank WF1 based on the probe position $P_P$ and the overtraveling amount of the stylus tip 211A calculated in the Step S7B and the profile data of the straight bevel gear W1 acquired by the information acquirer 31 (probe-command-value calculating step).

Specifically, the probe command unit 35 generates the velocity vector $V_C$ (probe command value) different from the above formula (7) in the workpiece coordinate system (the coordinate system defined by the central axis of the straight bevel gear W1 ($Z_W$-axis) and $X_W$-axis and $Y_W$-axis defined by the $Z_W$-axis) as described below.

The probe command unit 35 generates the velocity vector $V_H$ oriented in a $V_h$ direction (i.e. a direction passing through the probe position $P_P$ and perpendicular to a reference axis SAx) (see FIG. 9A) as shown in the following formula (9).

$$\vec{V}_H = h \cdot \vec{V}h \quad (9)$$

In the formula (9), h represents a deviation of the probe position $P_P$ from the lateral face of the imaginary cone IC (a parameter for controlling the velocity in the $V_h$ direction).

h is calculated according to the formula (10) below with the use of a unit vector $V_{hu}$ in the $V_h$ direction (see formula (11) below), a vector Q from the central axis ($Z_W$-axis) of the imaginary cone IC toward the probe position $P_P$ along a direction perpendicular to the central axis (see formula (12) below) and a vector S from the center $P_C$ to the probe position $P_P$.

$$h = (\vec{V}_{hu} \cdot \vec{S}) - r \cdot \cos(\alpha) \quad (10)$$

$$\vec{V}_{hu} = \sin(-\alpha) \cdot \vec{Z}_u + \cos(\alpha) \cdot \vec{Q}_u \quad (11)$$

$$\vec{Q} = \vec{S} - (\vec{Z}_u \cdot \vec{S}) \cdot \vec{Z}_u \quad (12)$$

In the formula (11), a vector $Q_u$ is a unit vector of the vector Q. Further, in the formula (12), a vector $Z_u$ is a unit vector in the $Z_W$-axis direction.

In other words, the probe command unit 35 calculates the vector Q according to the formula (12) with the use of the vector S and a vector projecting the vector S in the $Z_W$-axis direction (second term in the right-hand side of the formula (12)). Then, after calculating the $V_h$ direction by rotation according to the formula (11) with the use of the vectors $Z_u$ and $Q_u$ and the semi-apex angle $\alpha$, the probe command unit 35 calculates the deviation h according to the formula (10).

Further, as shown in the following formula (13), the probe command unit 35 generates the velocity vector $V_E$ in an overtraveling direction (deflection direction) E (FIG. 9B) of the stylus tip 211A against the tooth flank WF1.

$$\vec{V}_E = m \cdot (|\vec{E} - E_O|) \cdot \vec{E}_u \quad (13)$$

In the formula (13), m is a parameter for controlling the velocity in the overtraveling direction E. $E_O$ is a reference displacement of the stylus tip 211A (i.e. a target value in the overtraveling direction E). Specifically, when the overtraveling amount of the stylus tip 211A calculated in the Step S7B is $E_O$, the velocity in the overtraveling direction E can be calculated as 0 as shown in the formula (13). Further, the vector $E_u$ is a unit vector of the vector E based on the overtraveling amount of the stylus tip 211A calculated in the Step S7B.

Further, as shown in the following formula (14), the probe command unit 35 generates a velocity vector $V_F$ in an advancement direction V (FIGS. 9A and 9B) of the stylus tip 211A.

$$\vec{V}_F = n \cdot \vec{V}_u \quad (14)$$

In the formula (14), n is a parameter for controlling the velocity in the advancement direction. The vector $V_u$ is a unit vector of a vector V calculated according to the following formula (15).

$$\vec{V} = \vec{V}_{hu} \times \vec{E}_u \quad (15)$$

Thus, the direction of the outer product of the unit vector $V_{hu}$ in the $V_h$ direction and the unit vector $E_u$ of the vector E based on the overtraveling amount of the stylus tip 211A is defined as the advancement direction of the stylus tip 211A in this exemplary embodiment.

Then, the probe command unit 35 synthesizes each of the velocity vectors $V_H$, $V_E$ and $V_F$ as shown in the following formula (16) to generate a velocity vector $V_C$ (probe command value) in the scanning direction in which the stylus tip 211A is moved along the tooth flank WF1.

In other words, the probe command unit 35 generates the probe command value for moving the stylus tip 211A in a direction summing the $V_h$ direction, the overtraveling direction E and the advancement direction V.

$$\vec{V}_C = \vec{V}_H + \vec{V}_E + \vec{V}_F \quad (16)$$

After the Step S7E, the probe command unit 35 outputs the velocity vector $V_C$ calculated in the Step S7E to the drive control unit 36 (Step S7F).

Then, the stylus tip 211A is moved in accordance with the velocity vector $V_C$ shown in the formula (16), whereby the stylus tip 211A is moved along the lateral face of the imaginary cone IC while keeping a constant distance between the reference axis SAx and the probe position $P_P$ (i.e. conforming to the tooth flank WF1).

As described above, the velocity vector $V_C$ (probe command value) is calculated for every predetermined sampling time in the Step S7E and the velocity vector $V_C$ is outputted to the drive control unit 36 in the Step S7F in this exemplary embodiment.

After the Step S7F, the motion controller 3 recognizes the number of the measurement data (probe position $P_P$) stored in the storage 34 and judges whether or not the number of the measurement data exceeds a designated point number N (Step S7G).

When the motion controller 3 judges "N" in the Step S7G, the motion controller 3 again performs the processing of the Step S7A.

On the other hand, when the probe command unit 35 judges "Y" in the Step S7G, the probe command unit 35 outputs to the drive control unit 36 the probe command value for stopping the movement of the stylus tip 211A (Step S7H).

Then, the stylus tip 211A stops its movement while being in contact with the tooth flank WF1.

After the step S7H, the probe command unit 35 outputs to the drive control unit 36 the probe command value for moving the stylus tip 211A in the normal direction of the tooth flank WF1 based on the overtraveling amount of the stylus tip 211A calculated by the arithmetic processor 33 (Step S7I).

Then, the probe 21 (stylus tip 211A) is separated from the tooth flank WF1.

After the step S7I, the motion controller 3 outputs the N measurement data (probe positions $P_P$) stored in the storage 34 to the host computer 5 (step S7J).

Based on the N measurement data, the profile analysis is performed by the host computer 5 (form analyzer 51).

The above-described first exemplary embodiment provides the following advantages.

In the first exemplary embodiment, based on the finding that the tooth flank WF1 of the straight bevel gear W1 (workpiece) extends along the lateral face of the virtually defined imaginary cone IC and substantially conforms to the vertical cross section of the imaginary cone IC, the profile measuring method employs the information acquisition step S1 and the probe-command-value calculating step S7E.

The stylus tip 211A is moved along the velocity vector $V_C$ calculated in the probe-command-value calculating step S7E, whereby the stylus tip 211A is movable along the lateral face of the imaginary cone IC while keeping a constant distance between the reference axis SAx and the probe position $P_P$ (i.e. conforming to the tooth flank WF1). In other words, the tooth flank WF1 of the straight bevel gear W1 can be measured by the autonomous scanning measurement.

Thus, as compared to an instance in which the tooth flank WF1 of the straight bevel gear W1 is measured by a point measurement, the measurement time can be significantly reduced.

Second Exemplary Embodiment

Next, a second exemplary embodiment of the invention will be described below.

Incidentally, the same components as those in the first exemplary embodiment will be denoted by the same reference signs and the like and detailed description of the components will be omitted below.

Figure 10:
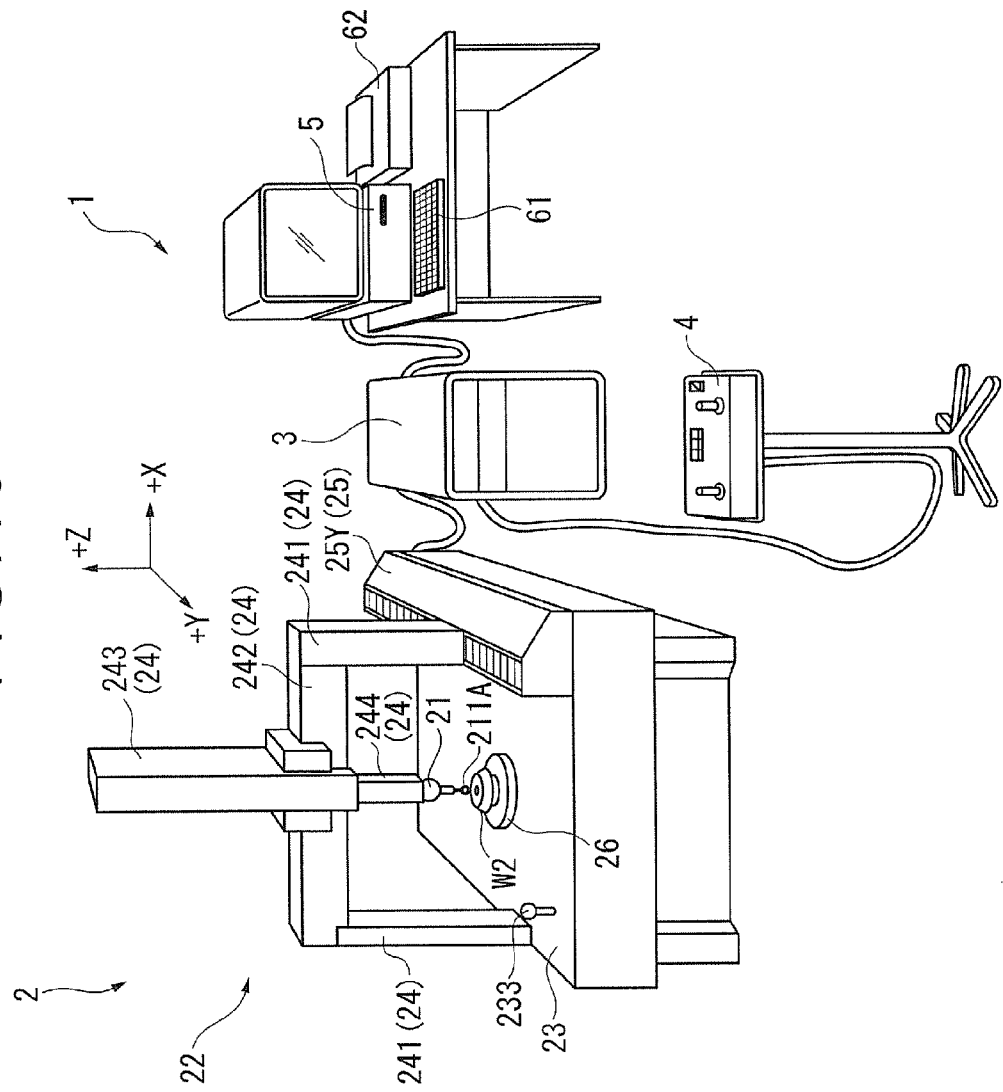
FIG. 10 schematically illustrates an overview of a coordinate measuring machine according to a second exemplary embodiment of the invention.

FIG. 10 schematically illustrates an overview of a coordinate measuring machine 1 according to the second exemplary embodiment.

Figure 11:
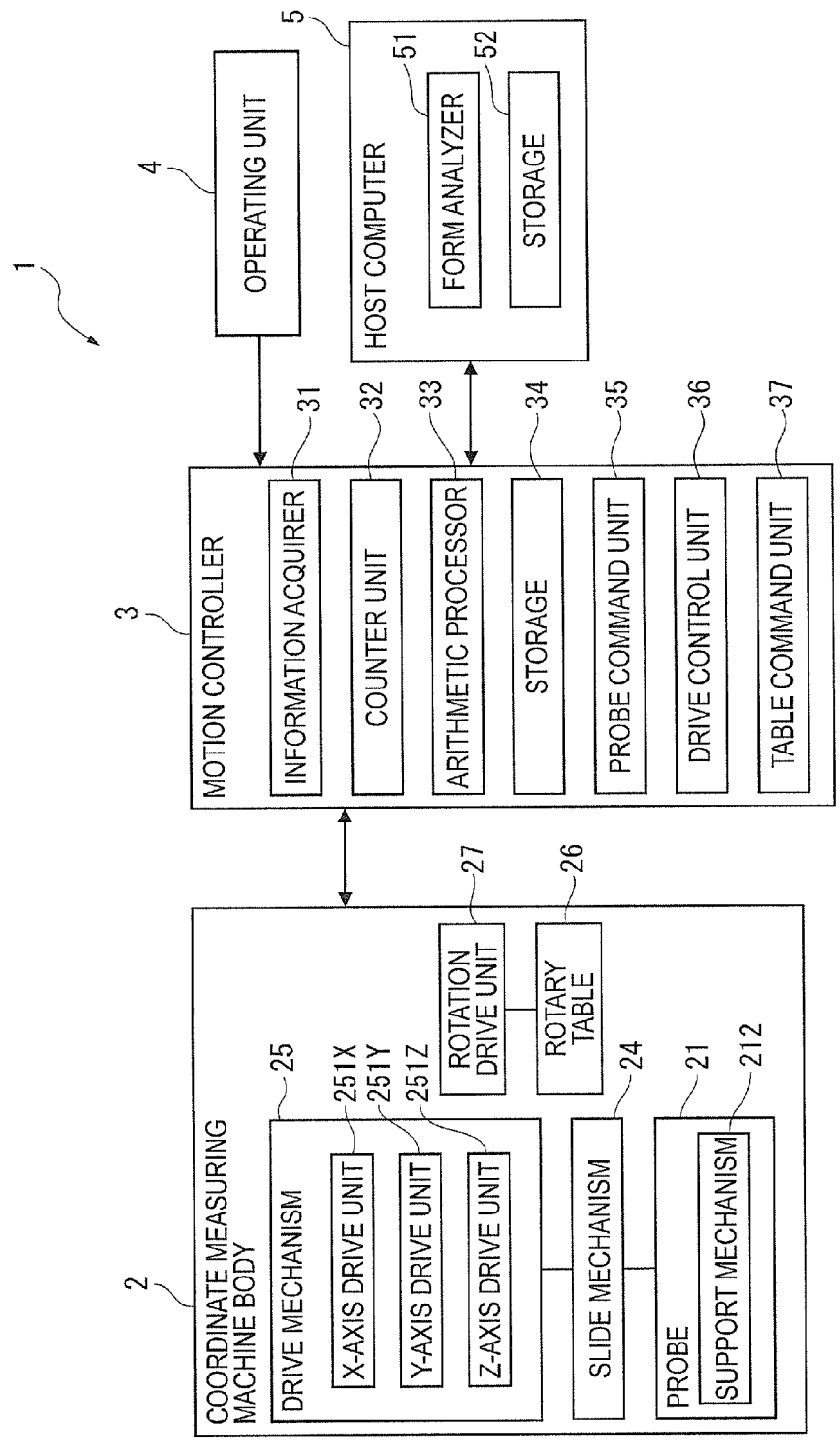
FIG. 11 is a block diagram showing an overall structure of the coordinate measuring machine according to the second exemplary embodiment.

FIG. 11 is a block diagram showing an overall structure of the coordinate measuring machine 1.

Figure 12A:
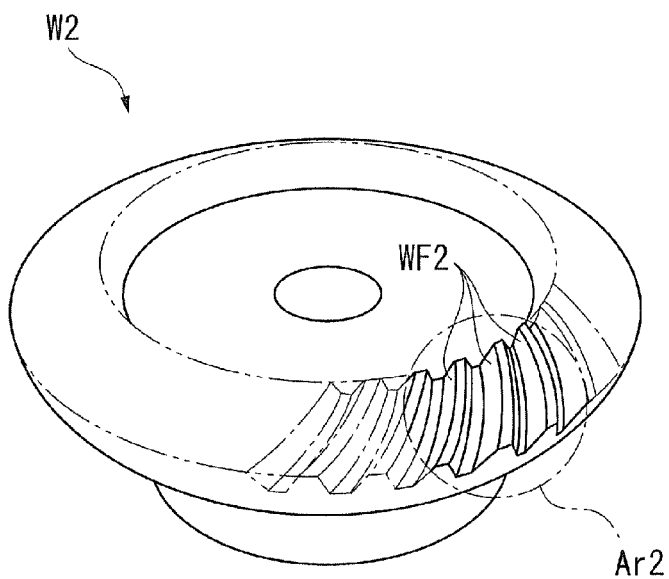
FIG. 12A illustrates a workpiece in the second exemplary embodiment.
Figure 12B:
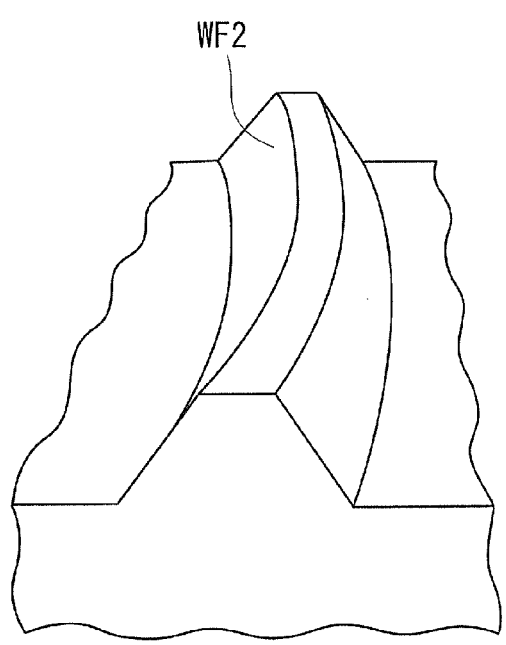
FIG. 12B illustrates the workpiece in the second exemplary embodiment.

FIGS. 12A and 12B illustrate a helical bevel gear W2 (workpiece). Specifically, FIG. 12A is a perspective view of the helical bevel gear W2. FIG. 12B is a perspective view enlarging an area Ar2 in FIG. 12A to show a tooth flank WF2 (measurement target face).

Incidentally, in order to simplify the drawing, only a part of teeth of the helical bevel gear W2 is shown in solid lines and the rest of the teeth are imaginarily shown in two-dot chain lines in FIG. 12A in a manner similar to FIG. 19A.

The second exemplary embodiment differs from the first exemplary embodiment only in that, as shown in FIGS. 10 to 12B, a different workpiece is used and, in accordance with the difference in the workpiece, a rotary table 26 and a rotation drive unit 27 are added to the coordinate measuring machine body 2 while a table command unit 37 is added to the motion controller 3. The rest of the components are the same as those in the first exemplary embodiment.

Specifically, as shown in FIGS. 12A and 12B, the helical bevel gear W2 (with the tooth flank WF2 as the measurement target face) having a curved tooth trace is used instead of the straight bevel gear W1 having a linear tooth trace.

The rotary table 26 is a substantially disc-shaped member, which is supported on an upper surface of the base 23 in a manner rotatable around a central axis ($Z_t$-axis (see FIG. 15)) of the rotary table 26.

The helical bevel gear W2 is fixed on the rotary table 26 with a chuck (not shown) provided to the rotary table 26.

Incidentally, the helical bevel gear W2 may be fixed on the rotary table 26 at a position where a central axis ($Z_W$-axis) of the helical bevel gear W2 matches the central axis ($Z_t$-axis) of the rotary table 26 or, alternatively, the helical bevel gear W2 may be fixed on the rotary table 26 at a position where the $Z_W$-axis does not match the $Z_t$-axis. In the later-described FIG. 15, the latter instance is illustrated.

The rotation drive unit 27 rotates the rotary table 26 along the upper surface of the base 23.

Incidentally, though not illustrated, the rotation drive unit 27 is provided with a sensor for detecting a rotation amount of the rotary table 26. The sensor outputs pulse signals corresponding to the rotation amount of the rotary table 26. The counter unit 32 counts the pulse signals outputted from the above-described sensor to measure the rotation amount of the rotary table 26 and outputs the rotation amount to the host computer 5. The form analyzer 51 performs a profile analysis based on the measurement data outputted from the motion controller 3 and the rotation amount of the rotary table 26.

The table command unit 37 calculates a table command value for rotating the rotary table 26 based on the velocity vector $V_C$ calculated by the probe command unit 35.

Next, a profile measuring method according to the second exemplary embodiment will be described below.

FIG. 13 is a flowchart showing the profile measuring method according to the second exemplary embodiment.

Figure 14:
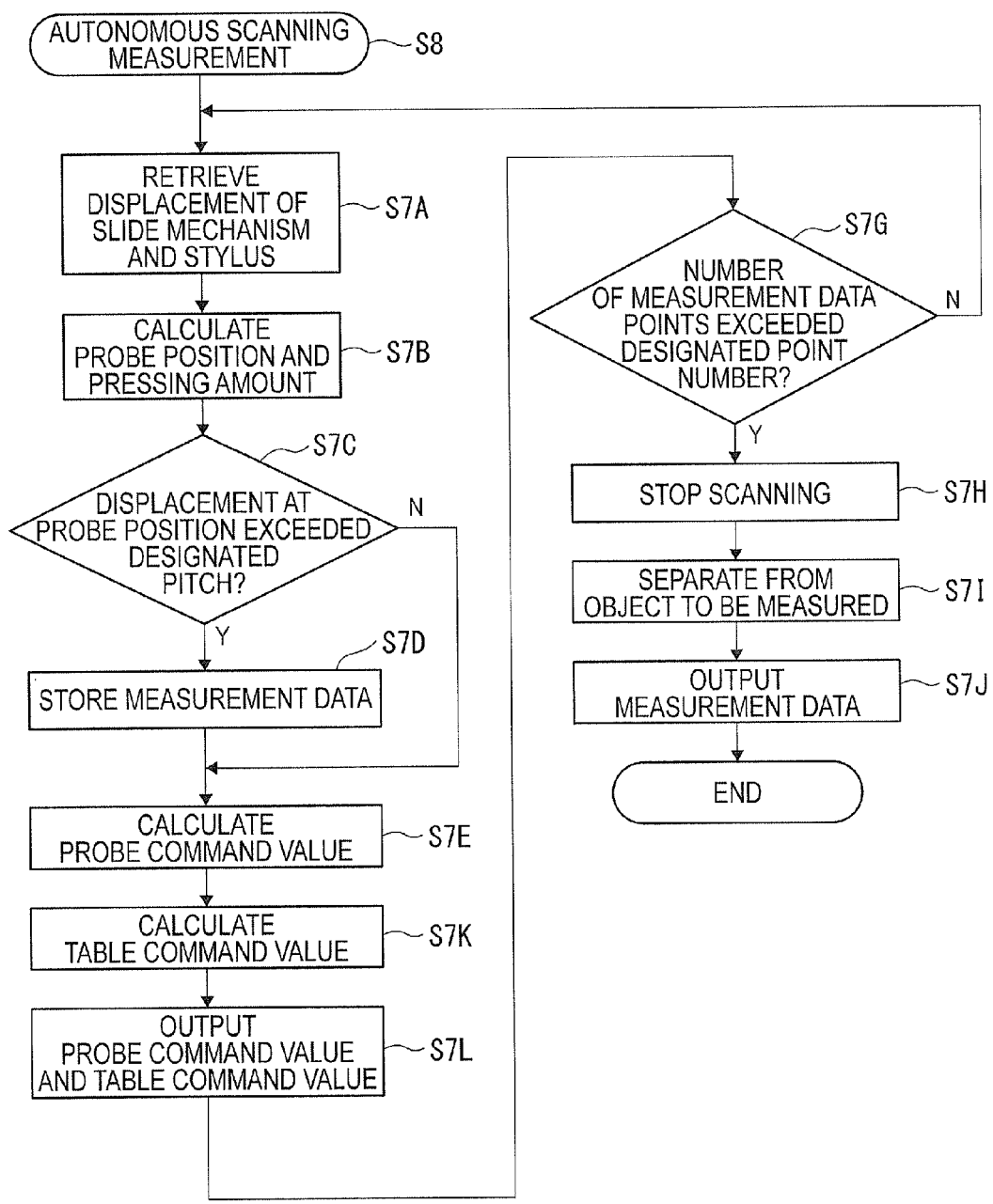
FIG. 14 is a flowchart showing a Step S8 according to the second exemplary embodiment.

FIG. 14 is a flowchart showing a Step S8.

FIGS. 15 to 17D are illustrations showing the Step S8.

Incidentally, FIGS. 17A to 17D illustrate a workpiece W different from the helical bevel gear W2 in order to schematically show a control process for keeping a constant orientation of the stylus tip 211A.

In the profile measuring method according to the second exemplary embodiment, the Step S8 as described below is performed as shown in FIG. 13 instead of the Step S7 in the profile measuring method according to the first exemplary embodiment. Thus, the Step S8 will be mainly described below.

Incidentally, the data acquired in the Step S1 in the second exemplary embodiment is a profile data related to the helical bevel gear W2 (i.e. a data including the radius r of the bottom face of the imaginary cone IC that is imaginarily defined in accordance with the outer profile of the helical bevel gear W2 (see FIGS. 16A and 16B) and the like), and the measurement condition data (i.e. a data including coordinates of the temporarily designated measurement start point and the like) that is designated in accordance with the outer profile of the helical bevel gear W2.

In the Steps S2 to S6, the processing is performed based on the measurement condition data of the helical bevel gear W2. The same applies in the Step S7E.

Initially, the motion controller 3 performs the Steps S7A to S7E in the same manner as in the first exemplary embodiment.

After the Step S7E, the table command unit 37 calculates the table command value (an angular velocity $\omega_t$ for rotating the rotary table 26) based on the velocity vector $V_C$ (probe command value) calculated in the Step S7E as shown below (Step S7K: table-command-value calculating step).

It should be noted that the Step S7K is substantially the same as a calculation process of an angular velocity $\omega_t$ disclosed in JP-B-3433710. Thus, the description of the Step S7K will be simplified below.

Initially, the table command unit 37 calculates an angular velocity $\omega_w$ of the rotary table 26 around the central axis ($Z_W$-axis) of the helical bevel gear W2 with reference to the velocity vector $V_C$ of the probe 21.

Specifically, the table command unit 37 calculates the angular velocity $\omega_w$ according to the following formula (17).

$$\omega_W = \frac{(\vec{V}_C, \vec{C}_u)}{|\vec{C}_r|} \quad (17)$$

Figure 15:
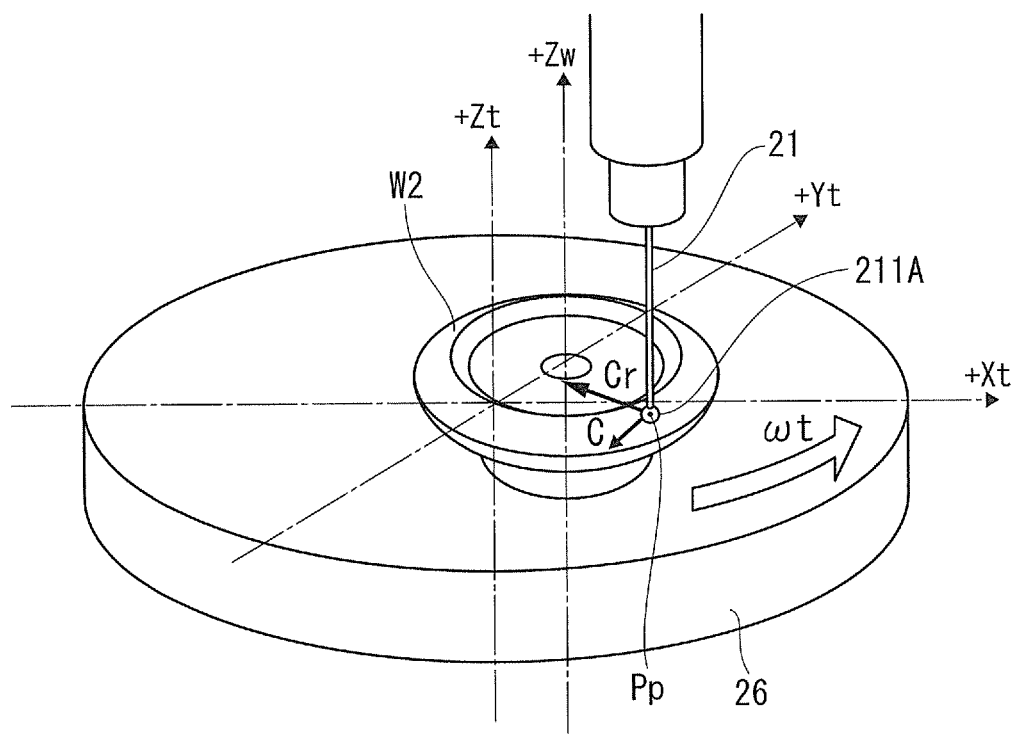
FIG. 15 is an illustration showing the Step S8 according to the second exemplary embodiment.

In the formula (17), the vector $C_r$ is a perpendicular vector drawn from the probe position $P_P$ to the $Z_W$-axis as shown in FIG. 15. The vector $C_u$ is a unit vector in a reference direction C (FIG. 15) relative to the vector $C_r$.

Incidentally, the reference direction C shown in FIG. 15 represents a direction at a position at which a rotary angle θ of the rotary table 26 and the probe position $P_P$ are situated as shown in FIG. 15. In other words, the reference direction C varies in accordance with the rotation of the rotary table 26.

Next, the table command unit 37 adjusts an advancement or delay relative to a target value of the rotary angle θ due to a control error with reference to the rotary angle θ of the rotary table 26 and the positional relationship of the probe position $P_P$ and calculates a corrected angular velocity $\Delta\omega$ so that the vector $C_r$ always becomes 90 degrees against the reference direction C.

Specifically, the table command unit 37 calculates the corrected angular velocity $\Delta\omega$ according to the following formula (18).

$$\Delta\omega = S \cdot (\vec{C}_u, \vec{C}_{ru}) \tag{18}$$

In the formula (18), n is a angular velocity compensation coefficient of the rotary table 26. The vector $C_{ru}$ is a unit vector of the vector $C_r$.

The table command unit 37 calculates the angular velocity $\omega_t$ for rotating the rotary table 26 according to the following formula (19).

$$\omega_t = \omega_w + \Delta\omega \tag{19}$$

After the Step S7K, the probe command unit 35 and the table command unit 37 outputs the probe command value to the drive control unit 36 and outputs the table command value (angular velocity $\omega_t$) to the rotation drive unit 27 (Step S7L).

In the second exemplary embodiment, the probe command unit 35 outputs to the drive control unit 36 the probe command value substantially the same as the probe command value disclosed in JP-B-3433710 in the Step S7L.

Specifically, the probe command unit 35 calculates a velocity vector $V_{\omega t}$ at a point X (probe position $P_P$) when the rotary table 26 is rotated at the angular velocity $\omega_t$ according to the following formula (20).

$$\vec{V}_{\omega t} = \vec{\omega}_t \times \vec{X} \tag{20}$$
$$= \begin{vmatrix} i & j & k \\ 0 & 0 & 0 \\ X_x & X_y & X_z \end{vmatrix}$$
$$= \begin{pmatrix} -X_{y^*}\omega_t \\ X_{x^*}\omega_t \\ 0 \end{pmatrix}$$

Then, as shown in the following formula (21), the probe command unit 35 outputs a vector sum $V_T$ of the velocity vector $V_{\omega t}$ calculated by the formula (20) and the velocity vector $V_C$ calculated in the Step S7E as the probe command value.

$$\vec{V}_T = \vec{V}_C + \vec{V}_{\omega t} \tag{21}$$
$$= \begin{pmatrix} V_x \\ V_y \\ V_z \end{pmatrix} + \begin{pmatrix} -X_{y^*}\omega_t \\ X_{x^*}\omega_t \\ 0 \end{pmatrix}$$
$$= \begin{pmatrix} V_x - X_{y^*}\omega_t \\ V_y + X_{x^*}\omega_t \\ V_z \end{pmatrix}$$

Figure 16A:
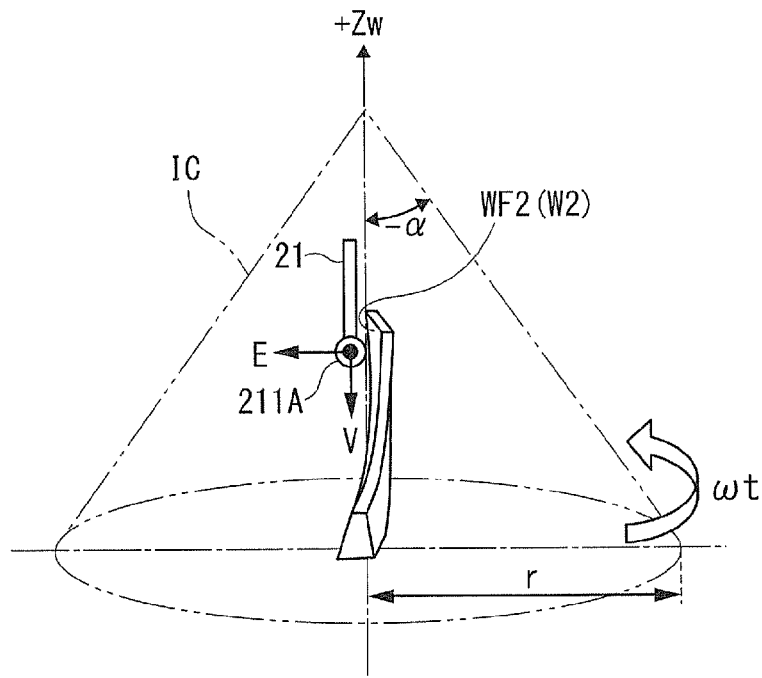
FIG. 16A is another illustration showing the Step S8 according to the second exemplary embodiment.
Figure 16B:
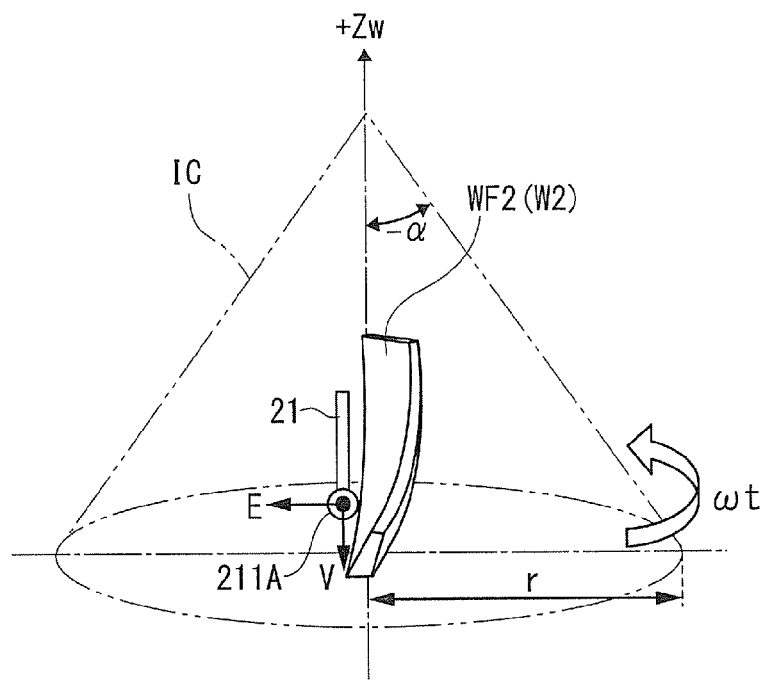
FIG. 16B is still another illustration showing the Step S8 according to the second exemplary embodiment.
Figure 17A:
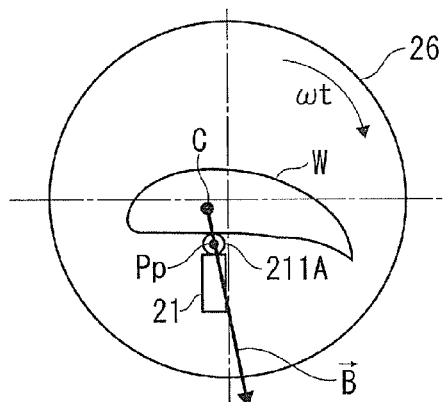
FIG. 17A is a further illustration showing the Step S8 according to the second exemplary embodiment.
Figure 17B:
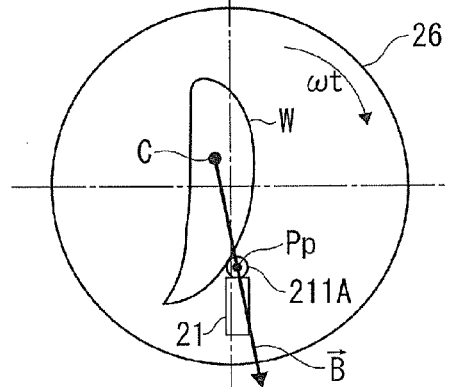
FIG. 17B is a still further illustration showing the Step S8 according to the second exemplary embodiment.
Figure 17C:
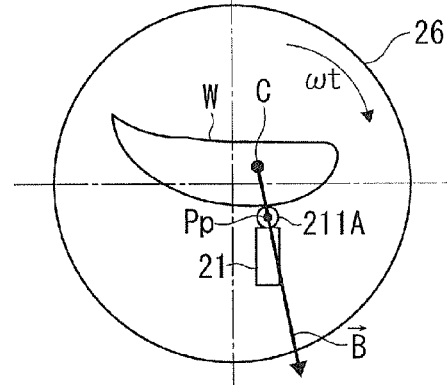
FIG. 17C is a still further illustration showing the Step S8 according to the second exemplary embodiment.
Figure 17D:
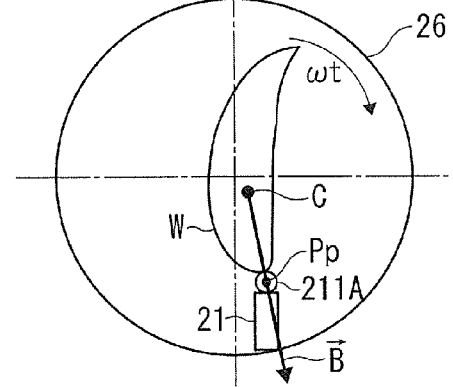
FIG. 17D is a still further illustration showing the Step S8 according to the second exemplary embodiment.
Figure 18:
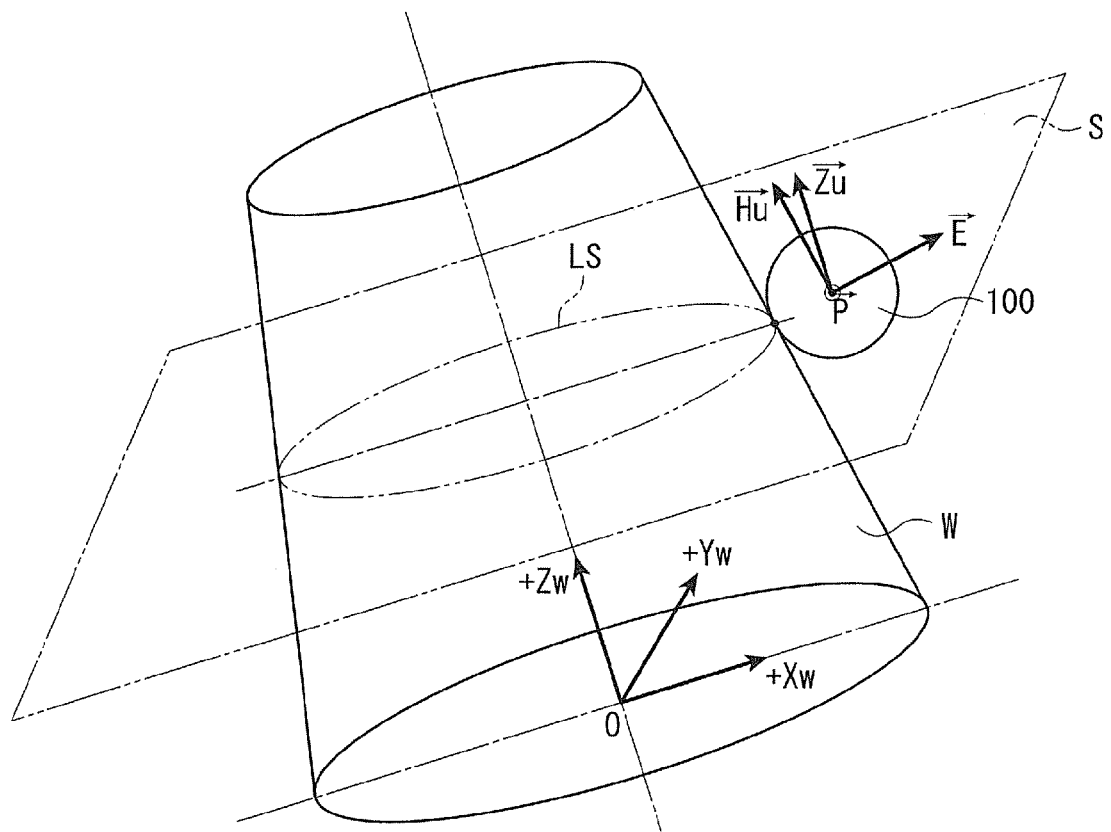
FIG. 18 shows a stylus tip moved along a measurement target face of a truncated-cone-shaped workpiece W.

The probe 21 is moved in accordance with the velocity vector $V_T$ and the rotary table 26 is moved according to the angular velocity $\omega_t$, whereby the stylus tip 211A moves along the tooth flank WF2 of the helical bevel gear W2 as shown in FIGS. 16A and 16B.

According to the components of the velocity vector $V_{\omega t}$ in the velocity vector $V_T$, the orientation of the stylus tip 211A can be kept constant as shown in FIGS. 17A to 17D.

Specifically, even when the rotary table 26 is rotated in an order from FIG. 17A to FIG. 17D as the time passes, a vector B (i.e. a vector defined by projecting the vector extending from an origin C of the workpiece W (corresponding to the center $P_C$ ($Z_W$-axis) of the bottom face of the imaginary cone IC) to the probe position $P_P$ on the table surface of the rotary table 26) can be kept constant with reference to the machine coordinate system.

Incidentally, in the second exemplary embodiment, the probe command value and the table command value are calculated per a predetermined sampling time in the Steps S7E and S7K and the probe command value and the table command value are outputted to the drive control unit 36 and the rotation drive unit 27 in the Step S7L as in the first exemplary embodiment.

After the Step S7L, the motion controller 3 performs the Steps S7G to 57J in the same manner as in the first exemplary embodiment.

The above-described second exemplary embodiment provides the following advantages in addition to the same advantages as those in the first exemplary embodiment.

In the second exemplary embodiment, the profile measuring method is provided with the table-command-value calculating step S7K.

Since the rotary table 26, the rotation drive unit 27 and the table command unit 37 are added to the coordinate measuring machine 1 and the table-command-value calculating step S7K is added in the profile measuring method as compared to the first exemplary embodiment, the autonomous scanning measurement can be performed on the tooth flank WF2 of the helical bevel gear W2 of which tooth trace is curved unlike the straight bevel gear W1.

Specifically, in the table-command-value calculating step S7K, the table command value for rotating the rotary table 26 is calculated based on the velocity vector $V_C$ calculated in the probe-command-value calculating step S2. Thus, the rotary table 26 (helical bevel gear W2) can be rotated in synchronization with the movement of the stylus tip 211A in accordance with the velocity vector $V_C$, whereby the stylus tip 211A can be moved along the curved tooth trace of the helical bevel gear W2.

In addition, since the rotary table 26 can be rotated in synchronization with the movement of the stylus tip 211A in accordance with the velocity vector $V_C$, it is not necessary to alter the attitude of the probe 21 considering the mechanical interference between the helical bevel gear W2 and the probe 21 when the autonomous scanning measurement is performed on the tooth flank WF2 of the helical bevel gear W2. In other words, since it is not necessary to alter the attitude of the probe 21, the measurement time can be further reduced.

It should be appreciated that the scope of the invention is not limited to the above exemplary embodiments but modifications and improvements that are compatible with an object of the invention are included within the scope of the invention.

Though the workpiece is the straight bevel gear W1 or the helical bevel gear W2 in the exemplary embodiments, different workpiece is measurable as long as the following conditions (1) and (2) or the conditions (1) and (3) are met.

(1) An imaginary cone can be defined in accordance with the profile of the workpiece.

(2) A measurement target face of the workpiece extends along a lateral face of the imaginary cone and substantially conforms with a vertical cross section of the imaginary cone.

(3) The measurement target face of the workpiece extends along the lateral face of the imaginary cone and is twisted along the lateral face.

Though the motion controller 3 in the above-described exemplary embodiments judges that the autonomous scanning measurement is terminated when the number of measurement data reaches the designated point number N, the termination of the autonomous scanning measurement may be determined in a different manner.

For instance, the termination of the autonomous scanning measurement may be determined when the $Z_W$-axis coordinate value at the probe position $P_P$ becomes a predetermined height $Z_e$ or less.

Alternatively, the termination of the autonomous scanning measurement may be determined when the probe position $P_P$ reaches within a sphere with a radius $R_C$ and predetermined central coordinates $(X_C, Y_C, Z_C)$.

What is claimed is:

1. A profile measuring method using a profile measuring instrument, the profile measuring instrument comprising: a probe having a stylus tip to be in contact with a workpiece; a movement mechanism that is adapted to move the probe; and a controller that is adapted to control the movement mechanism, the stylus tip being moved along a measurement target face of the workpiece while the stylus tip is pressed against the measurement target face of the workpiece to measure a profile of the measurement target face, the profile measuring instrument comprising a rotary table on which the workpiece is adapted to be fixed, the rotary table being adapted to be rotated to rotate the workpiece relative to the probe, the method comprising:

acquiring profile information on the profile of the workpiece;

calculating a first command value for moving the probe by the movement mechanism based on the profile information acquired in the acquiring of the information;

calculating a table command value for rotating the rotary table; and calculating a probe command value by correcting the first command value, the acquiring of the information, the calculating of the first command value, the calculating of the table command value and the calculating of the probe command value being performed by the controller, wherein the first command value is calculated as a value for causing a movement of the stylus tip along a lateral face of an imaginary cone that is imaginarily defined in accordance with the profile of the workpiece based on the profile information, the movement of the stylus tip being performed while a distance between a center of the stylus tip and a reference axis passing through a center of a bottom face of the imaginary cone and parallel to the lateral face of the imaginary cone is kept constant, the stylus tip being moved in a linear direction parallel to the reference axis, the table command value is calculated based on an angular velocity for rotating the rotary table calculated based on the first command value and a position of the probe and a corrected angular velocity calculated based on an angular compensation coefficient of the angular velocity, and the probe command value is calculated by synthesizing a velocity vector calculated based on the table command value and the first command value.

2. A profile measuring instrument comprising:

a probe having a stylus tip to be in contact with a workpiece;

a movement mechanism that is adapted to move the probe;

a controller that is adapted to control the movement mechanism, the stylus tip being moved along a measurement target face of the workpiece while the stylus tip is pressed against the measurement target face of the workpiece to measure a profile of the measurement target face; and a rotary table on which the workpiece is adapted to be fixed, the rotary table being adapted to be rotated to rotate the workpiece relative to the probe, wherein the controller comprises:

an information acquirer that acquires profile information on the profile of the workpiece;

a probe command unit that calculates a probe command value for moving the probe by the movement mechanism based on the profile information acquired by the information acquirer; and a table command unit that calculates a table command value for rotating the rotary table, the probe command unit calculates a first command value for causing a movement of the stylus tip along a lateral face of an imaginary cone that is imaginarily defined in accordance with an outer profile of the workpiece based on the profile information, the movement of the stylus tip being performed while a distance between a center of the stylus tip and a reference axis passing through a center of a bottom face of the imaginary cone and parallel to the lateral face of the imaginary cone is kept constant, the stylus tip being moved in a linear direction parallel to the reference axis, the table command unit calculates the table command value based on an angular velocity for rotating the rotary table calculated based on the first command value and a position of the probe and a corrected angular velocity calculated based on an angular compensation coefficient of the angular velocity, and the probe command unit calculates the probe command value by synthesizing a velocity vector calculated based on the table command value and the first command value.

* * * * *